United States Patent
Hirate

(10) Patent No.: US 9,442,976 B2
(45) Date of Patent: Sep. 13, 2016

(54) RELATED-WORD REGISTRATION DEVICE, INFORMATION PROCESSING DEVICE, RELATED-WORD REGISTRATION METHOD, PROGRAM FOR RELATED-WORD REGISTRATION DEVICE, RECORDING MEDIUM, AND RELATED-WORD REGISTRATION SYSTEM

(75) Inventor: Yu Hirate, Shinagawa-ku (JP)

(73) Assignee: Rakuten, Inc., Tokyo (JP)

(*) Notice: Subject to any disclaimer, the term of this patent is extended or adjusted under 35 U.S.C. 154(b) by 489 days.

(21) Appl. No.: 13/884,342

(22) PCT Filed: Nov. 7, 2011

(86) PCT No.: PCT/JP2011/075574
§ 371 (c)(1),
(2), (4) Date: May 9, 2013

(87) PCT Pub. No.: WO2012/063772
PCT Pub. Date: May 18, 2012

(65) Prior Publication Data
US 2013/0232170 A1    Sep. 5, 2013

(30) Foreign Application Priority Data

Nov. 10, 2010 (JP) ................. 2010-252327

(51) Int. Cl.
G06F 17/20 (2006.01)
G06F 17/30 (2006.01)

(52) U.S. Cl.
CPC ..... *G06F 17/30424* (2013.01); *G06F 17/3064* (2013.01); *G06F 17/30731* (2013.01)

(58) Field of Classification Search
CPC .......... G06F 17/2795; G06F 17/30737; G06F 17/30424; G06F 17/30707; G06F 17/30646; G06F 17/3097; G06F 17/30979

USPC .................................. 707/10, 769
See application file for complete search history.

(56) References Cited

U.S. PATENT DOCUMENTS 7,636,714 B1* 12/2009 Lamping et al.
7,840,589 B1* 11/2010 Holt et al. ............ 707/769

(Continued)

FOREIGN PATENT DOCUMENTS

| EP | 2051174 A | 4/2009 |
| JP | 2001-290840 A | 10/2001 |
| JP | 2006-85389 A | 3/2006 |

(Continued)

OTHER PUBLICATIONS

Masaaki Ohkubo et al., "Extracting Information Demand by Analyzing a WWW Search Log", Transactions of Information Processing Society of Japan, Jul. 1998, pp. 2250-2258, vol. 39, No. 7.

(Continued)

*Primary Examiner* — Debbie Le
(74) *Attorney, Agent, or Firm* — Sughrue Mion, PLLC

(57) ABSTRACT

A search query including a search word entered by the user is obtained (S4), the obtained search query is stored in association with user identification information and acquisition time of the search query into a search query log DB 12a (S5). In the case where a predetermined user operation is detected, search queries corresponding to the user identification information of the user are extracted (S6). A first search query is specified from the extracted search queries (S7), a second search query whose acquisition time is earlier than acquisition time of the first search query is specified from the extracted search queries (S8 and S9). A search word in the first search query and a search word in the second search query are registered as related words into a related-word DB 12b (S10).

19 Claims, 21 Drawing Sheets

(56) References Cited

U.S. PATENT DOCUMENTS

| | | |
|---|---|---|
| 7,937,383 B2 * | 5/2011 | Hintze et al. ............... 707/706 |
| 8,285,714 B2 * | 10/2012 | Ji et al. ..................... 707/728 |
| 8,316,019 B1 * | 11/2012 | Ainslie et al. .............. 707/733 |
| 2008/0201297 A1 | 8/2008 | Choi et al. |
| 2009/0024613 A1 | 1/2009 | Niu et al. |
| 2010/0057728 A1 * | 3/2010 | Quick et al. ................ 707/5 |
| 2010/0138292 A1 * | 6/2010 | Park et al. ................ 705/14.46 |
| 2010/0228710 A1 | 9/2010 | Imig et al. |

FOREIGN PATENT DOCUMENTS

| | | |
|---|---|---|
| KR | 0544514 B | 1/2006 |
| KR | 20090007060 A | 1/2009 |

OTHER PUBLICATIONS

Takanori Ugai et al., "Using the Knowledge from Search Engine Log", IPSJ SIG Notes, Oct. 2000, pp. 61-66, vol. 2000, No. 97.
International Search Report for PCT/JP2011/075574 dated Dec. 6, 2011.

* cited by examiner

RELATED-WORD REGISTRATION DEVICE, INFORMATION PROCESSING DEVICE, RELATED-WORD REGISTRATION METHOD, PROGRAM FOR RELATED-WORD REGISTRATION DEVICE, RECORDING MEDIUM, AND RELATED-WORD REGISTRATION SYSTEM

TECHNICAL FIELD

The present invention relates to a technical field of a related-word registration device, an information processing device, a related-word registration method, a program for a related-word registration device, a recording medium, and a related-word registration system for registering a search keyword as a related word.

BACKGROUND ART

A database of words such as a synonym dictionary obtained by collecting words having high relativeness is used for supplement of a search keyword and increase in precision of translation and the like in an information search system, a natural language processing system, a machine translation system, and the like. Various devices for automatically generating words having high relativeness and using them for a search and the like are being studied. For example, Patent Document 1 discloses a keyword searching device which obtains a character string of an input keyword, extracts a comment including the keyword, extracts only nouns from the words by performing morphological analysis process, divides a Japanese sentence by words, extracts the word with word class, generates a word histogram for organizing the extracted words in descending order of the number of use times, assures words whose number of use times is large as a related keyword, and re-retrieves a comment on the basis of the related keyword.

CITATION LIST

Patent Document

Patent Document JP 2001-290840 A

SUMMARY OF THE INVENTION

Problem to be Solved by the Invention

In the technique disclosed in the Patent Document 1, however, since a search keyword and a characteristic word whose number of use times is large in a comment of a page of a search result are stored as related words, a search keyword (incomplete search keyword) which is entered during a process to the search result cannot be considered. Therefore, even if the related words are used, the user cannot reach a target search object quickly. There is a case that the user stops the searching activity. It cannot be always said that related words have high precision.

The present invention is achieved in view of such a problem, and an example of an object is to provide a related-word registration device and the like capable of registering a high-precision related word.

Means for Solving the Problem

In order to solve the above problem, an aspect of an invention includes: a search query obtaining means that obtains a search query including a search word entered by the user; a search query storing means that stores the obtained search query in association with user identification information and acquisition time of the search query; a search query extracting means, in the case where a predetermined user operation is detected, that extracts search queries corresponding to the user identification information of the user; a first search query specifying means that specifies a first search query from the extracted search queries; a second search query specifying means that specifies a second search query whose acquisition time is earlier than acquisition time of the first search query, from the extracted search queries; and a related-word registering means that registers, as related words, a search word in the first search query and a search word in the second search query into a related-word database.

Another aspect of an invention is characterized in that, in the related-word registration device, the second search query specifying means specifies, as a second search query, a search query whose acquisition time is earlier than acquisition time of the first search query and having continuity based on the acquisition time from the extracted search queries.

Another aspect of an invention is characterized in that, in the related-word registration device, the second search query specifying means specifies, as a second search query, a search query whose acquisition time is within first predetermined time since acquisition time of the first search query.

Another apsect of an invention is characterized in that, in the related-word registration device, the second search query specifying means specifies, as a second search query, search queries whose an interval of acquisition times is within second predetermined time in the extracted search queries.

Another aspect of an invention is characterized in that the related-word registration device further includes predetermined time setting means that sets the first predetermined time or the second predetermined time.

Another aspect of an invention is characterized in that, in the related-word registration device, predetermined time setting means sets the first predetermined time or the second predetermined time on the basis of the number of related words registered by the related-word registering means.

Another aspect of an invention is characterized in that, in the related-word registration device, predetermined time setting means calculates operation time from the predetermined user operation and, on the basis of the operation time, sets the first predetermined time or the second predetermined time.

Another aspect of an invention is characterized in that, in the related-word registration device, the search query obtaining means obtains category information together with the search query in searching, and the second search query specifying means specifies, as a second search query, a search query matched with the category information, whose acquisition time is earlier than that of the first search query, and having continuity based on the acquisition time.

Another aspect of an invention is characterized in that, in the related-word registration device, the second search query specifying means specifies, as a second search query, a search query whose acquisition time is earlier than that of the first search query, having continuity based on the acquisition time, and whose number of search results is equal to or less than a predetermined value.

Another aspect of an invention is characterized in that the related-word registration device further includes a product procedure means that performs procedure process on a product, wherein in the case where the settlement procedure on a product of the user is detected as the predetermined user operation, the search query extracting means extracts a search query corresponding to the user identification information.

Another aspect of an invention is characterized in that the related-word registration device further includes a moving picture reproduction characteristic value calculating means that detects moving picture reproduction information as the predetermined user operation and calculates a moving picture reproduction characteristic value on the basis of the reproduction information, wherein in the case where the moving picture reproduction characteristic value is equal to or larger than a threshold, the search query extracting means extracts a search query corresponding to the user identification information.

Another aspect of an invention is characterized in that, in the related-word registration device, in the case where the number of pieces of link information clicked by the predetermined user operation in link information included in search results based on the search query is equal to or larger than a predetermined number, a search query corresponding to the user identification information is extracted.

Another aspect of an invention is characterized in that, in the related-word registration device, the first search query specifying means specifies, as a first search query, a search query whose acquisition time is closest to time at which the user operation is detected.

Another aspect of an invention is characterized in that, in the related-word registration device, the first search query specifying means specifies, as a first search query, a search query whose acquisition time is latest among search queries extracted.

Another aspect of an invention includes: a search query obtaining means that obtains a search query including a search word entered by the user; a search query storing means that stores the obtained search query in association with user identification information and acquisition time of the search query; a search query extracting means, in the case where a predetermined user operation is detected, that extracts search queries corresponding to the user identification information of the user; a first search query specifying means that specifies a first search query from the extracted search queries; a second search query specifying means that specifies, as a second search query, a search query different from the first search query from the extracted search queries; and a related-word registering means that registers, as related words, a search word in the first search query and a search word in the second search query into a related-word database.

Another aspect of an invention described is characterized in that, in the related-word registration device, in the case where a predetermined user operation is detected, the search query extracting means extracts a search query corresponding to the user identification information of the user and having continuity based on the acquisition time.

Another aspect of an invention is characterized in that, in the related-word registration device, the search query extracting means extracts, as a search query having continuity based on the acquisition time, a search query obtained within first predetermined time since acquisition time of a search query whose acquisition time is latest in search queries stored in the search query storing means.

Another apsect of an invention is characterized in that, in the related-word registration device, the search query extracting means extracts, as search queries having continuity based on the acquisition time, search queries whose an interval of acquisition times is within second predetermined time.

Another aspect of an invention is characterized in that, in the related-word registration device, the search query obtaining means obtains category information together with the search query in searching, and the search query extracting means extracts search queries having matched category information, corresponding to identification information of the user, and having continuity based on the acquisition time.

Another aspect of an invention is characterized in that, in the related-word registration device, the search query extracting means extracts search queries corresponding to identification information of the user, having continuity based on the acquisition time, and whose number of search results is equal to or less than a predetermined value.

Another aspect of an invention relates to an information processing device for processing information with reference to a related-word database of the related-word registration device, including: a related-word extracting means that extracts a related word corresponding to a search word of the received search query with reference to the related-word database; and a related-word output means that outputs the related word extracted by the related-word extracting means.

Another aspect of an invention relates to a related-word registration method of a related-word registration device for registering related words, including: a search query obtaining step of obtaining a search query including a search word entered by the user; a search query storing step of storing the obtained search query in association with user identification information and acquisition time of the search query; a search query extracting step, in the case where a predetermined user operation is detected, of extracting search queries corresponding to the user identification information of the user; a first search query specifying step of specifying a first search query from the extracted search queries; a second search query specifying step of specifying a second search query whose acquisition time is earlier than acquisition time of the first search query, from the extracted search queries; and a related-word registering step of registering, as related words, a search word in the first search query and a search word in the second search query into a related-word database.

Another aspect of an invention makes a computer function as: a search query obtaining means that obtains a search query including a search word entered by the user; a search query storing means that stores the obtained search query in association with user identification information and acquisition time of the search query; a search query extracting means, in the case where a predetermined user operation is detected, that extracts search queries corresponding to the user identification information of the user; a first search query specifying means that specifies a first search query from the extracted search queries; a second search query specifying means that specifies a second search query whose acquisition time is earlier than acquisition time of the first search query, from the extracted search queries; and a related-word registering means that registers, as related words, a search word in the first search query and a search word in the second search query into a related-word database.

Another aspect of an invention records a program for a related-word registration device, for making a computer function as: a search query obtaining means that obtains a search query including a search word entered by the user; a search query storing means that stores the obtained search query in association with user identification information and acquisition time of the search query; a search query extracting means, in the case where a predetermined user operation is detected, that extracts search queries corresponding to the user identification information of the user; a first search query specifying means that specifies a first search query from the extracted search queries; a second search query specifying means that specifies a second search query whose acquisition time is earlier than acquisition time of the first search query, from the extracted search queries; and a related-word registering means that registers, as related words, a search word in the first search query and a search word in the second search query into a related-word database.

Another aspect of an invention relates to a related-word registration system having a terminal, a related-word registration device which is connected to the terminal via a network, and receives a related word from the terminal, and a related-word database which registers the related word, wherein the terminal includes: a search query obtaining means that obtains a search query of a search word entered by the user; a search query storing means that stores the obtained search query in association with user identification information and acquisition time of the search query; a search query extracting means, in the case where a predetermined user operation is detected, that extracts search queries corresponding to the user identification information of the user; a first search query specifying means that specifies a first search query from the extracted search queries; a second search query specifying means that specifies a second search query whose acquisition time is earlier than acquisition time of the first search query, from the extracted search queries; and a related-word transmitting means that transmits, as related words for registration, a search word in the first search query and a search word in the second search query to the related-word registration device, and the related-word registration device includes related-word registering means that registers, as related words, the search word in the first search query and the search word in the second search query received into the related-word database.

Effect of the Invention

According to the present invention, a search query including a search word entered by the user is obtained, and the obtained search query is stored in association with user identification information and acquisition time of the search query. In the case where a predetermined user operation is detected, search queries corresponding to the user identification information of the user are extracted. A first search query is specified from the extracted search queries. A second search query whose acquisition time is earlier than acquisition time of the first search query is specified from the extracted search queries. As related words, a search word in the first search query and a search word in the second search query are registered into a related-word database. In such a manner, using the predetermined user operation as a trigger, search words included in search queries which vary in time are registered as related word in the search queries corresponding to the user identification information. Therefore, while maintaining the relativeness of the user, the search word included in the first search query close to the user operation time and the search word included in the second search query can be registered as high-precision related words.

MODES FOR CARRYING OUT THE INVENTION

Hereinafter, embodiments of the present invention will be described with reference to the drawings. The embodiments to be described relate to the case of applying the present invention to a related-word registration system.

[1. Summary of Configurations and Functions of Related-Word Registration System]

First, the configuration and schematic functions of a related-word registration system according to an embodiment of the present invention will be described using FIG. 1.

Figure 1:
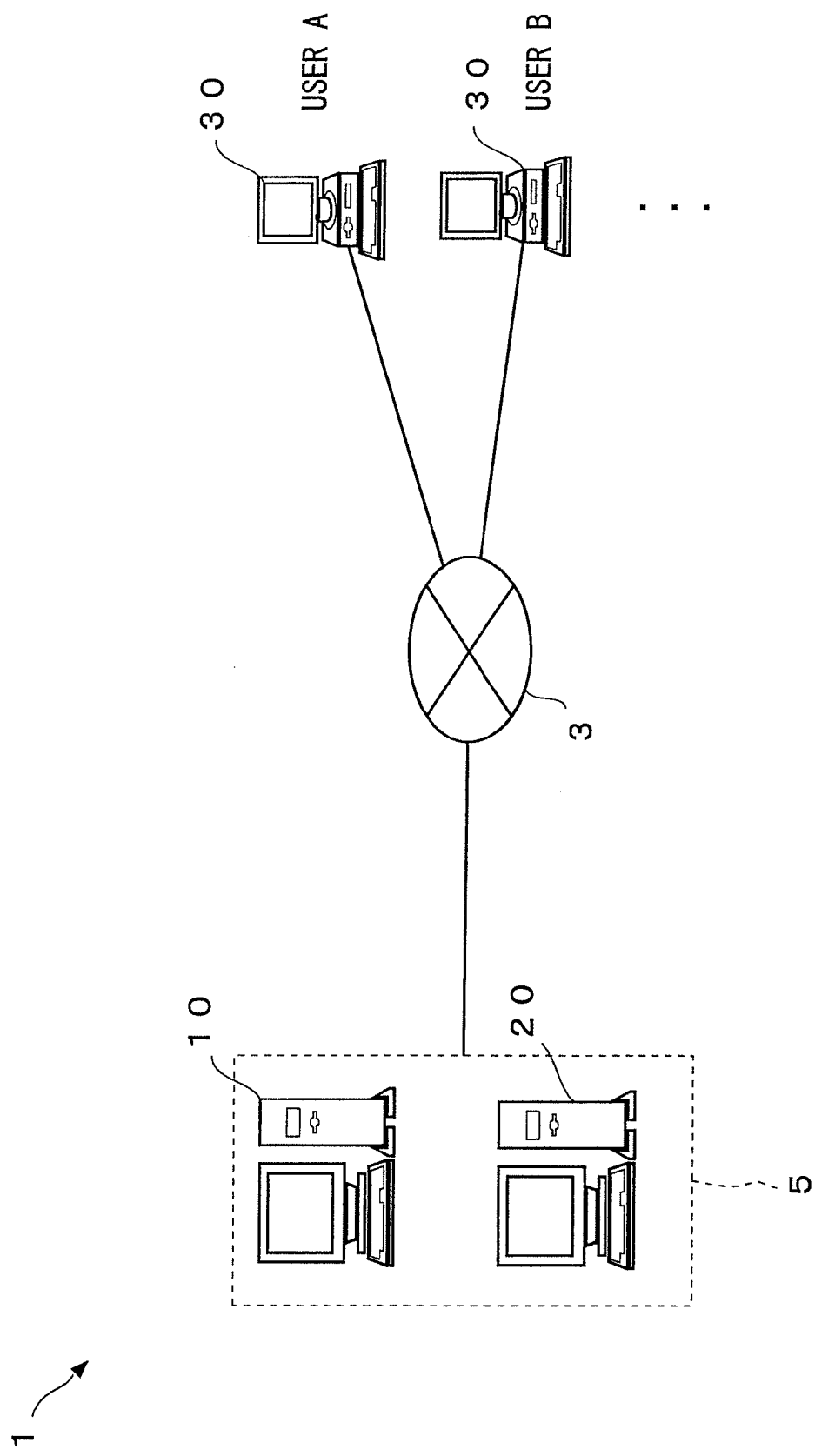
FIG. 1 is a schematic diagram illustrating an example of a schematic configuration of a related-word registration system as an embodiment of the present invention.

FIG. 1 is a schematic diagram illustrating an example of a schematic configuration of a related-word registration system 1 as an embodiment.

As illustrated in FIG. 1, the related-word registration system 1 includes a related-word registration server 10 (an example of a related-word registration device) which registers a related word, an information providing server 20 installed for operating a shopping site as an example of an information providing site used by the user, and for providing information registered in the related-word registration server 10 and information of products to the user, and a terminal 30 used by the user to retrieve a product and the like in the information providing server 20.

The related-word registration server 10 and the information providing server 20 are connected to each other via a local area network or the like so that data can be transmitted/received, and constitute a server system 5. The server system 5 and the terminal 30 are connected to each other via a network 3 and can transmit/receive data to/from each other by a communication protocol (such as TCP/IP). In addition, the network 3 is constructed by, for example, the Internet, a dedicated communication line (for example, a CATV (Community Antenna Television) line), a mobile communication network (including a base station and the like), a gateway, and the like.

The related-word registration server 10 builds a database of related words from search activities and the like of the user in the terminal 30 and the like and supports the search activities of the user in the terminal 30 and the like.

The information providing server 20 receives a search query from the terminal 30, performs a search, and transmits a search result to the terminal 30. The information providing server 20 transmits a received search query to the related-word registration server 10 in order to build a database of related words. The information providing server 20 performs, as a shopping site, a search for a product, provision of information of products, provision of advertisement information, procedure for purchasing a product, and the like.

A plurality of terminals 30 of users exists.

[2. Configurations and Functions of Servers]

(2.1 Configurations and Functions of Related-Word Registration Server 10)

The configurations and functions of the related-word registration server 10 will be described using FIG. 2.

Figure 2:
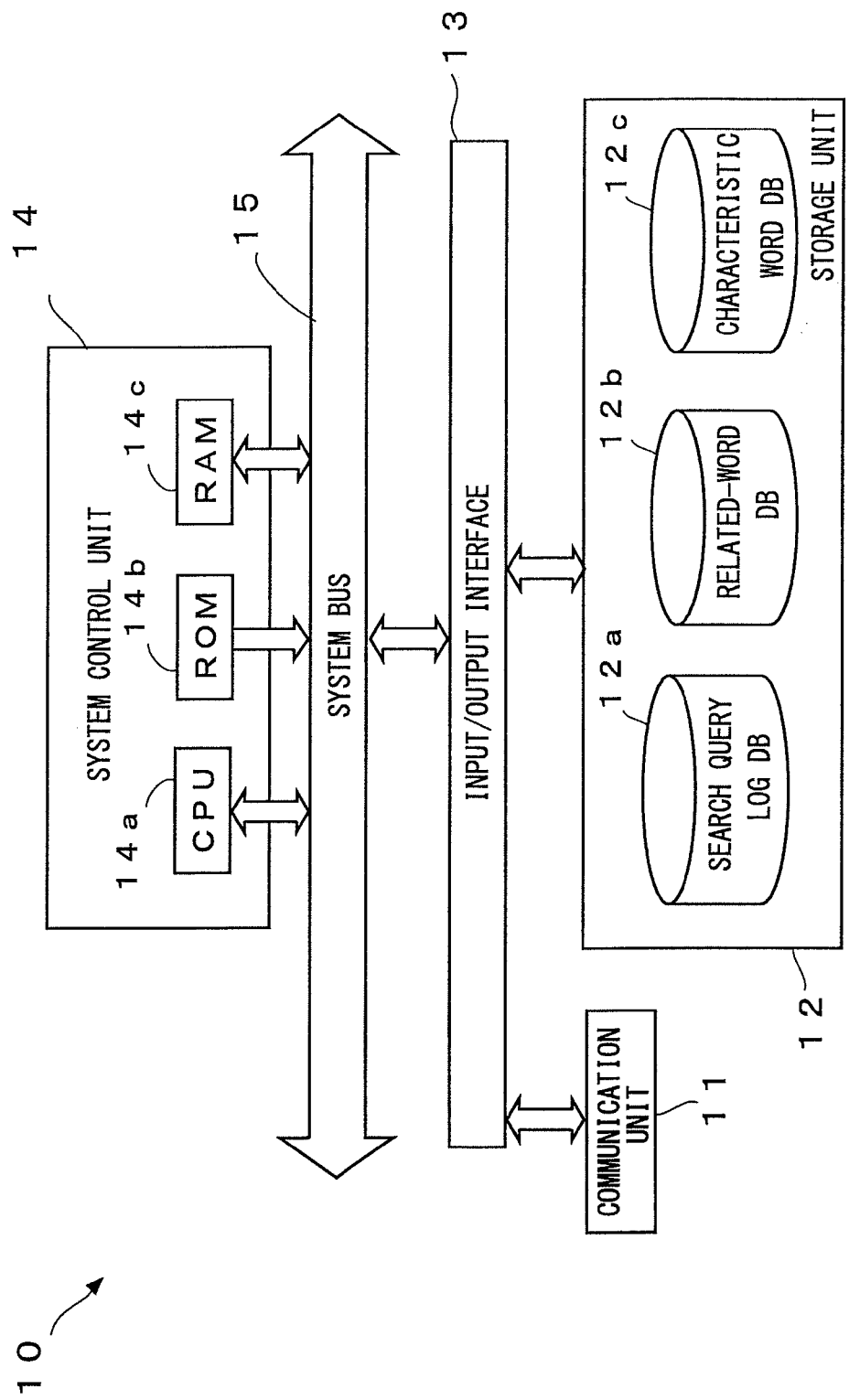
FIG. 2 is a block diagram illustrating an example of a schematic configuration of a related-word registration server in FIG. 1.

FIG. 2 is a block diagram illustrating an example of a schematic configuration of the related-word registration server 10.

As illustrated in FIG. 2, the related-word registration server 10 functioning as a computer has a communication unit 11, a storage unit 12, an input/output interface 13, and a system control unit 14. The system control unit 14 and the input/output interface 13 are connected to each other via a system bus 15.

The communication unit 11 is connected to the network 3 to control the state of communication with the terminal 30 or the like and, further, connected to the local area network to transmit/receive data to/from another server such as the information providing server 20 on the local area network.

The storage unit 12 is constructed by, for example, a hard disk drive or the like and stores various programs such as an operating system and a server program, data, and the like. In addition, the various programs may be obtained, for example, from another server device or the like via the network 3 or recorded in a recording medium and read via a drive device (not illustrated).

In the storage unit 12, a search query log database 12a (hereinbelow, called "search query log DB 12a") storing a log regarding a search query received from the terminal 30, a related-word database 12b (hereinbelow, called "related-word DB 12b") storing a related word generated from the search query, a database 12c for a characteristic word (hereinbelow, called "characteristic-word DB 12c") storing data necessary to extract a characteristic word from a web page, and the like are built. In addition, the search query log DB 12a, the related-word DB 12b, and the characteristic-word DB 12c may be constructed in another server other than the related-word registration server 10 in the server system 5 or may be constructed on the outside of the server system 5.

In the search query log DB 12a (an example of a search query storing means), a search query associated with received time of a search query and user identification information for discriminating the user such as a user ID is stored. In addition, the user identification information includes a user ID of a shopping site or the like, identification number of a user terminal or an access point, IP address, and the like. Further, when the user makes a product search in the information providing server 20, a search query is stored in the search query log DB 12a in association with category information such as a product category to which the product belongs or a product category displayed in a web page opened by the user.

In the related-word DB 12b, related words generated by the related-word registration server 10 are stored.

In the characteristic-word DB 12c, content information extracted from a database of the information providing server 20 or the like is stored to be used for extraction of a characteristic word.

Next, the input/output interface 13 performs interface process between the communication unit 11 and the storage unit 12 and the system control unit 14.

The system control unit 14 is constructed by a CPU (Central Processing Unit) 14a, a ROM (Read Only Memory) 14b, a RAM (Random Access Memory) 14c, and the like. The system control unit 14 reads and executes various programs stored in the ROM 14b and the storage unit 12 by the CPU 14a to perform a related-word registering process and the like.

(2.2 Configurations and Functions of Information Providing Server 20)

Next, the configurations and functions of the information providing server 20 will be described using FIG. 3.

Figure 3:
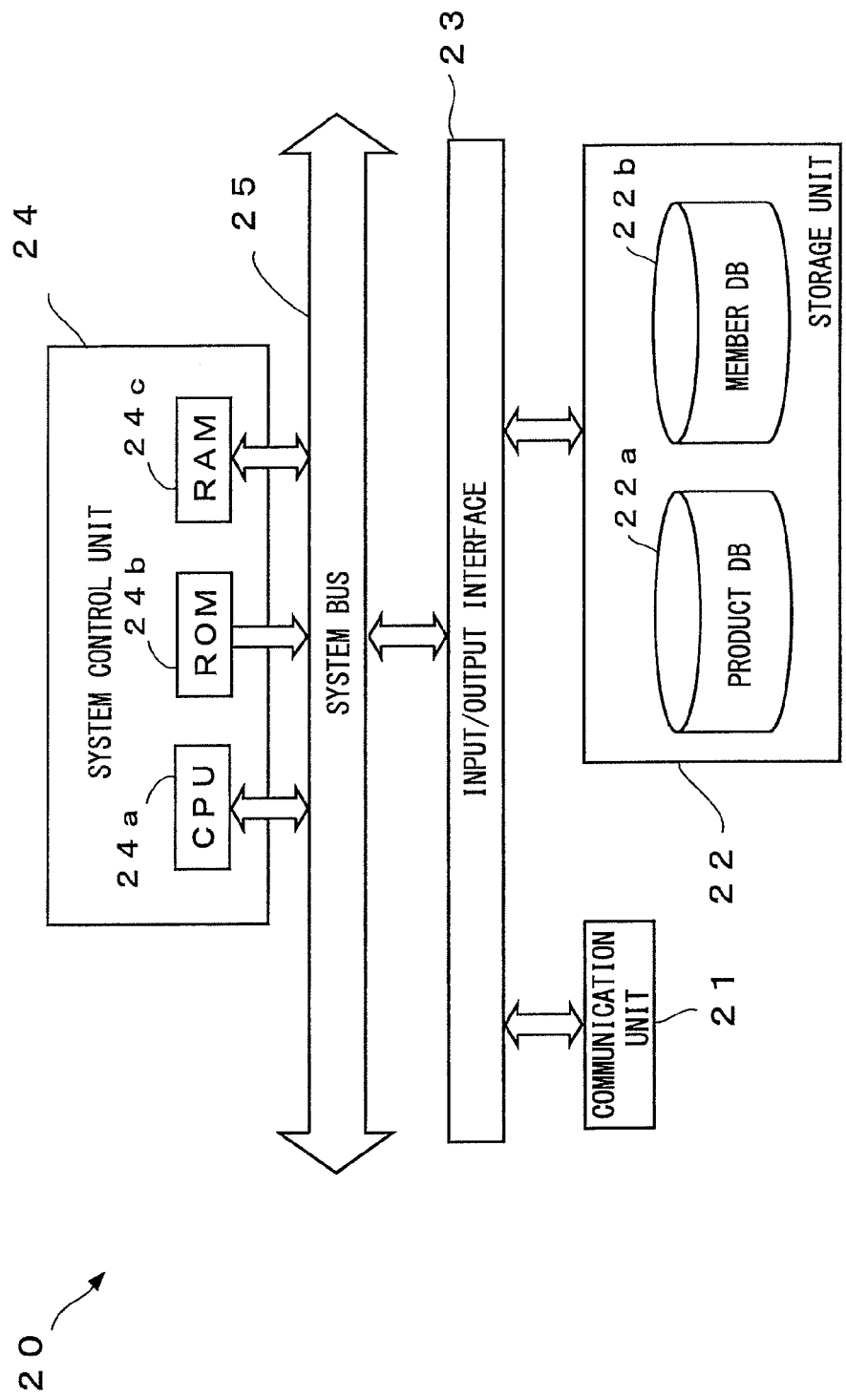
FIG. 3 is a block diagram illustrating an example of a schematic configuration of an information providing server in FIG. 1.

FIG. 3 is a block diagram illustrating an example of a schematic configuration of the information providing server 20.

As illustrated in FIG. 3, the information providing server 20 has a communication unit 21, a storage unit 22, an input/output interface 23, and a system control unit 24. The system control unit 24 and the input/output interface 23 are connected to each other via a system bus 25. In addition, since the configurations and functions of the information providing server 20 are almost the same as those of the related-word registration server 10, different things in the configurations and functions of the related-word registration server 10 will be mainly described.

The communication unit 21 controls the state of communication with the terminal 30, the related-word registration server 10, and the like via the network 3, the local area network, or the like.

In the storage unit 22, a product database 22a (hereinbelow, called "product DB 22a"), a member database 22b (hereinbelow, called "member DB 22b"), and the like are built.

In the product DB 22a, in association with a product ID as an identifier for identifying a product, the name and kind of the product, an image of the product, specifications, product information, advertisement information related to each of the products, and the like are stored. In the product DB 22a, product information is classified on the basis of the category information of products. In the product DB 22a, a file of a product web page described in a markup language such as HTML (Hyper Text Markup Language), XML (Extensible Markup Language), and the like is stored.

Further, in the product DB 22a, a search database for retrieving a product is constructed.

In the member DB 22b, user information such as the user ID of a user registered as a member (user of a shopping site), name, address, telephone number, mail address, occupation, hobbies, purchase history, themes and genres in which the user is interested, and the like is registered. In the member DB 22b, the user ID, log-in ID, and password necessary for the user to log in the shopping site from the terminal 30 are registered. Here, the log-in ID and password are log-in information used for log-in process (user authentication process).

The system control unit 24 includes a CPU 24a, a ROM 24b, and a RAM 24c. The system control unit 24 reads and executes various programs stored in the ROM 24b and the storage unit 22 by the CPU 24a to perform product searching process, product purchasing process by the user, and the like.

(2.3 Configurations and Functions of Terminal 30)

The configurations and functions of the terminal 30 will be described using FIG. 4.

Figure 4:
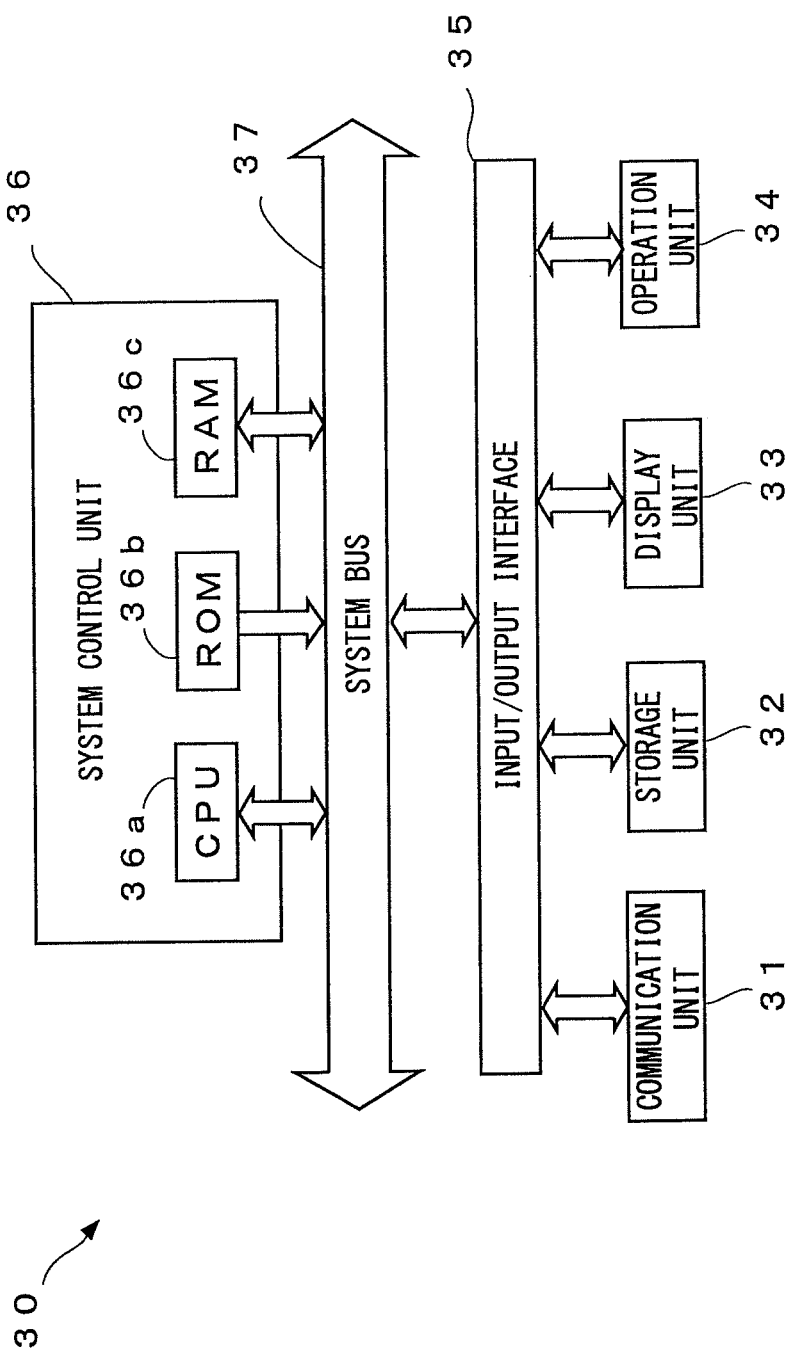
FIG. 4 is a block diagram illustrating an example of a schematic configuration of a terminal in FIG. 1.

FIG. 4 is a block diagram illustrating an example of the schematic configuration of the terminal 30.

As illustrated in FIG. 4, the terminal 30 functioning as a computer is, for example, a personal computer or a portable terminal such as a portable wireless telephone including a smartphone or a PDA and has a communication unit 31, a storage unit 32, a display unit 33, an operation unit 34, an input/output interface 35, and a system control unit 36. The system control unit 36 and the input/output interface 35 are connected to each other via a system bus 37.

The communication unit 31 controls communication with the information providing server 20 or the like via the network 3. In addition, in the case where the terminal 30 is a portable terminal device, the communication unit 31 has a wireless communication function for connection to the mobile communication network in the network 3.

The storage unit 32 is, for example, a hard disk drive or the like and stores an operating system, a program of a web browser, a program of a tool bar for the web browser, and the like.

The display unit 33 is constructed by, for example, a liquid crystal display device, an EL (Electro Luminescence) device, or the like. In the display unit 33, a web page of a search screen or a web page showing a result of a product search provided by the information providing server 20 is displayed by the web browser.

The operation unit 34 is constructed by, for example, a keyboard, a mouse, and the like. The user enters a response with the operation unit 34. In addition, in the case where the display unit 33 is a display panel of a touch switch system such as a touch panel, the operation unit 34 obtains position information of the display unit 33 where the user touched or approached.

The input/output interface 35 is an interface between the communication unit 31 and the storage unit 32 and the system control unit 36.

The system control unit 36 includes, for example, a CPU 36a, a ROM 36b, and a RAM 36c. The system control unit 36 reads and executes various programs stored in the ROM 36b, the RAM 36c, or the storage unit 32 by the CPU 36a. For example, the system control unit 36 executes a program of a web browser and functions as a web browser.

[3. Operation of Related-Word Registration System]

Next, the operation of the related-word registration system 1 according to an embodiment of the present invention will be described using FIGS. 5 to 11.

Figure 9:
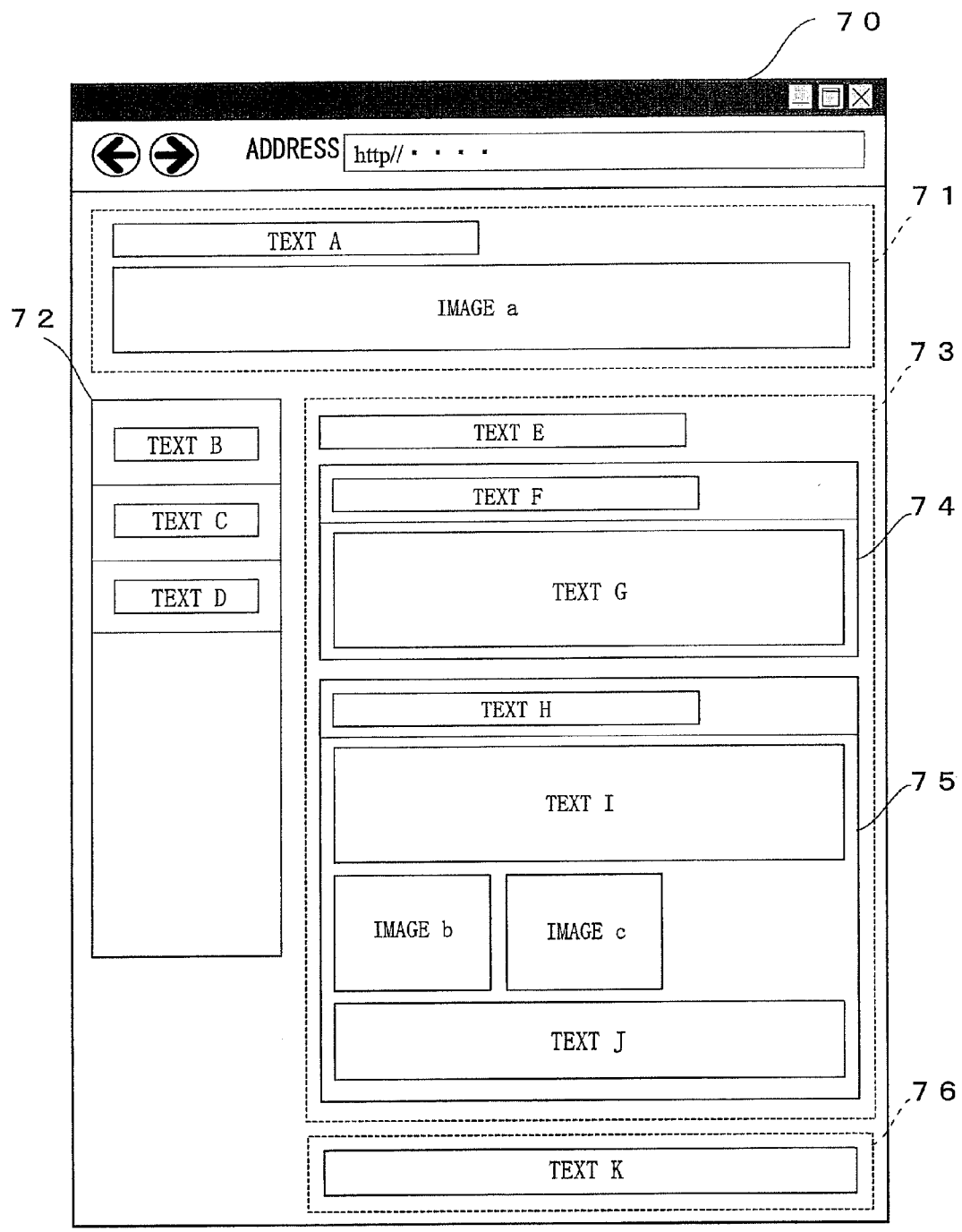
FIG. 9 is a schematic diagram illustrating an example of a web page displayed in the terminal in FIG. 1.
Figure 10:
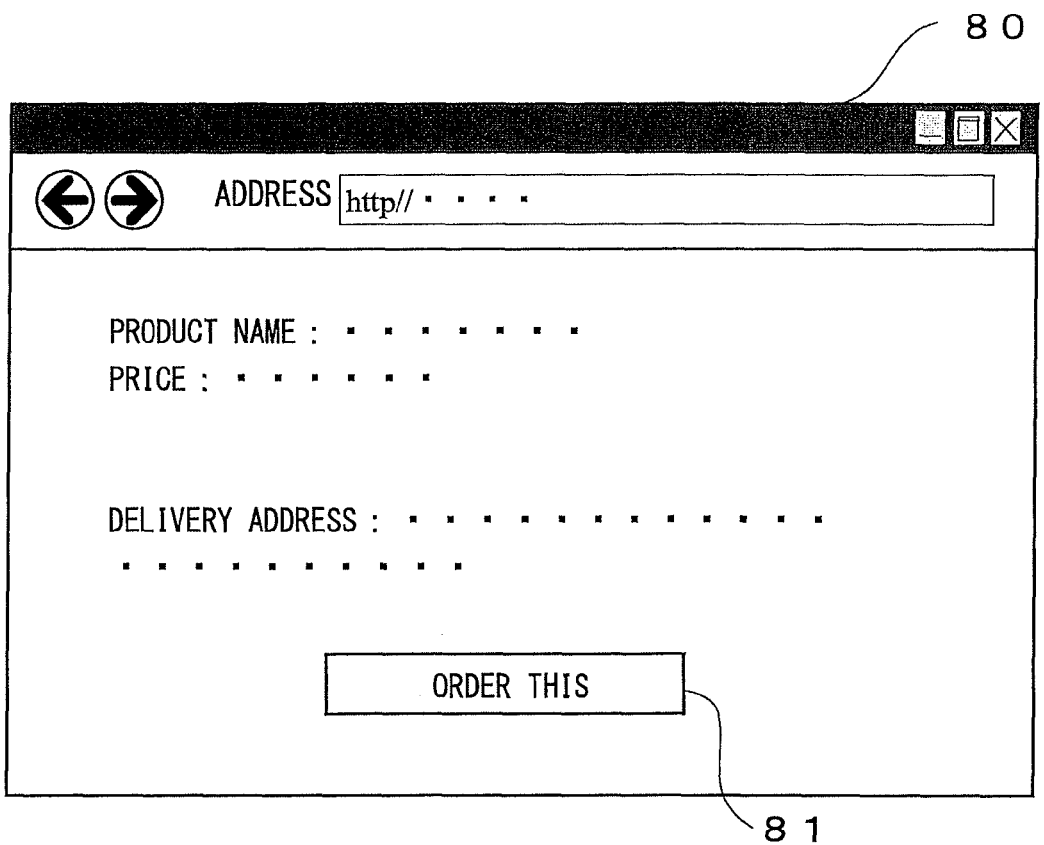
FIG. 10 is a schematic diagram illustrating an example of a web page displayed in the terminal in FIG. 1.
Figure 11:
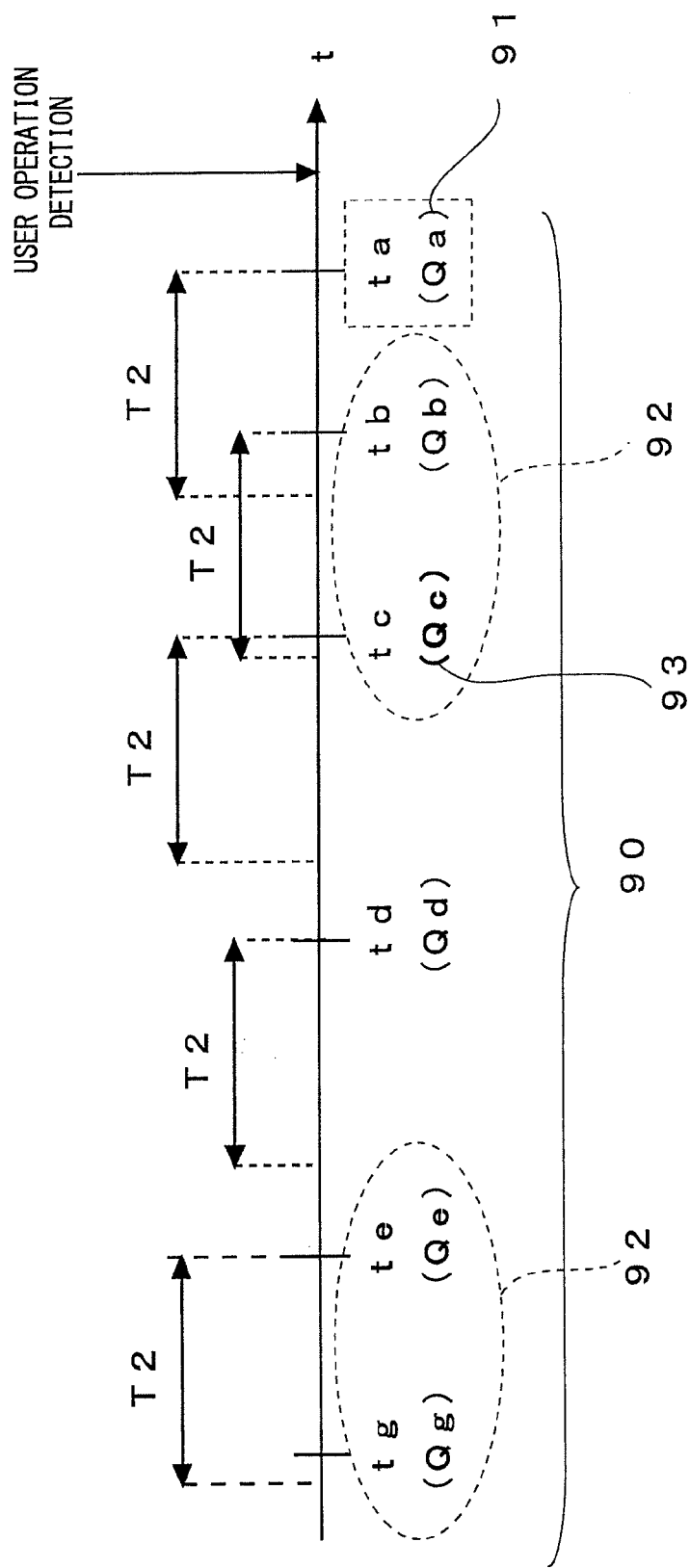
FIG. 11 is a schematic diagram illustrating an example of the relation between time when a user operation is detected and search query acquisition time.

FIG. 5 and FIGS. 7 to 10 are schematic diagrams illustrating an example of a web page displayed in the terminal 30. FIG. 6 is a flowchart illustrating an example of operations of the related-word registration server 10. FIG. 11 is a schematic diagram illustrating an example of the relation between time when a user operation is detected and search query acquisition time.

(3.1 Determination of User Operation and Generation of Search Query Log)

Using FIGS. 5 to 8, determination of a user operation and generation of a search query log in activities of the user who logs in a shopping site, retrieves a target product while searching for products, and takes a procedure of purchasing the retrieved product will be described.

Figure 5:
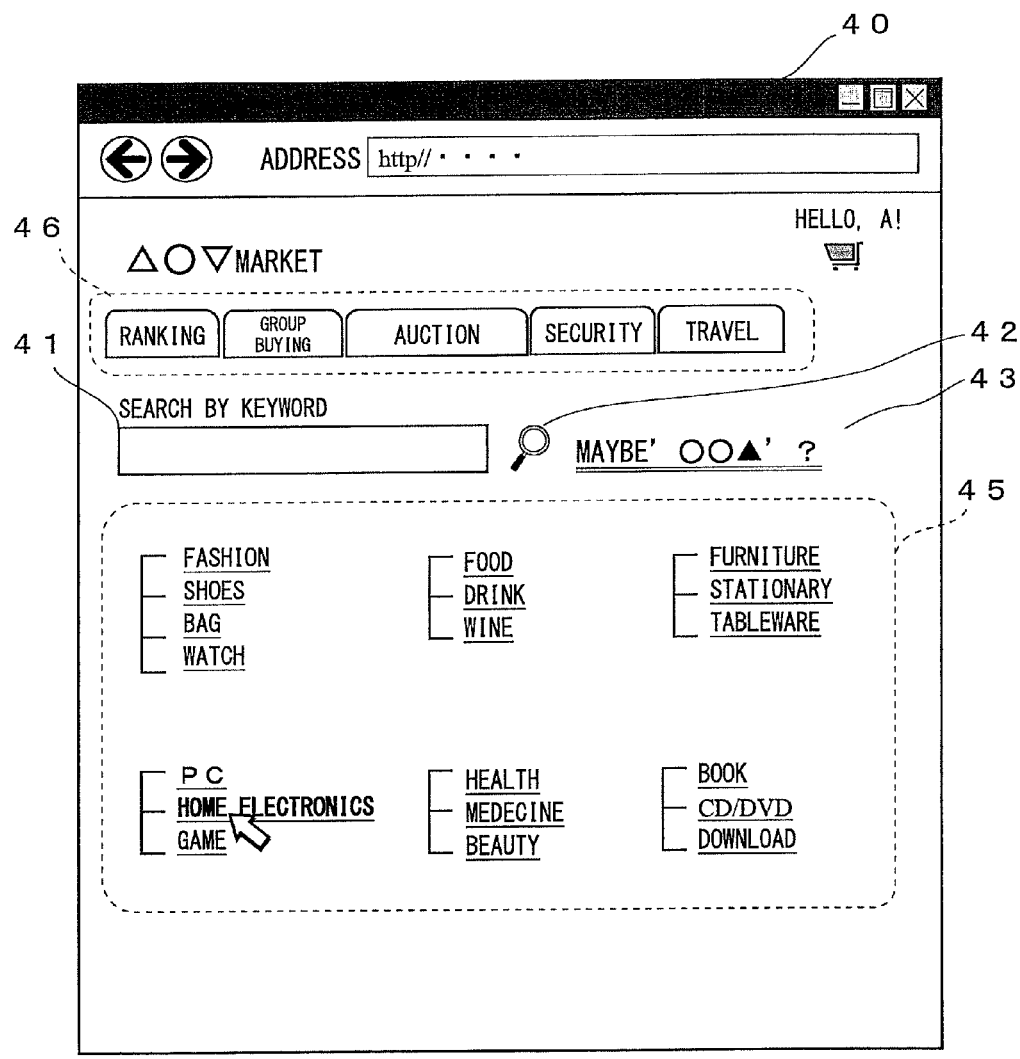
FIG. 5 is a schematic diagram illustrating an example of a web page displayed in the terminal in FIG. 1.
Figure 6:
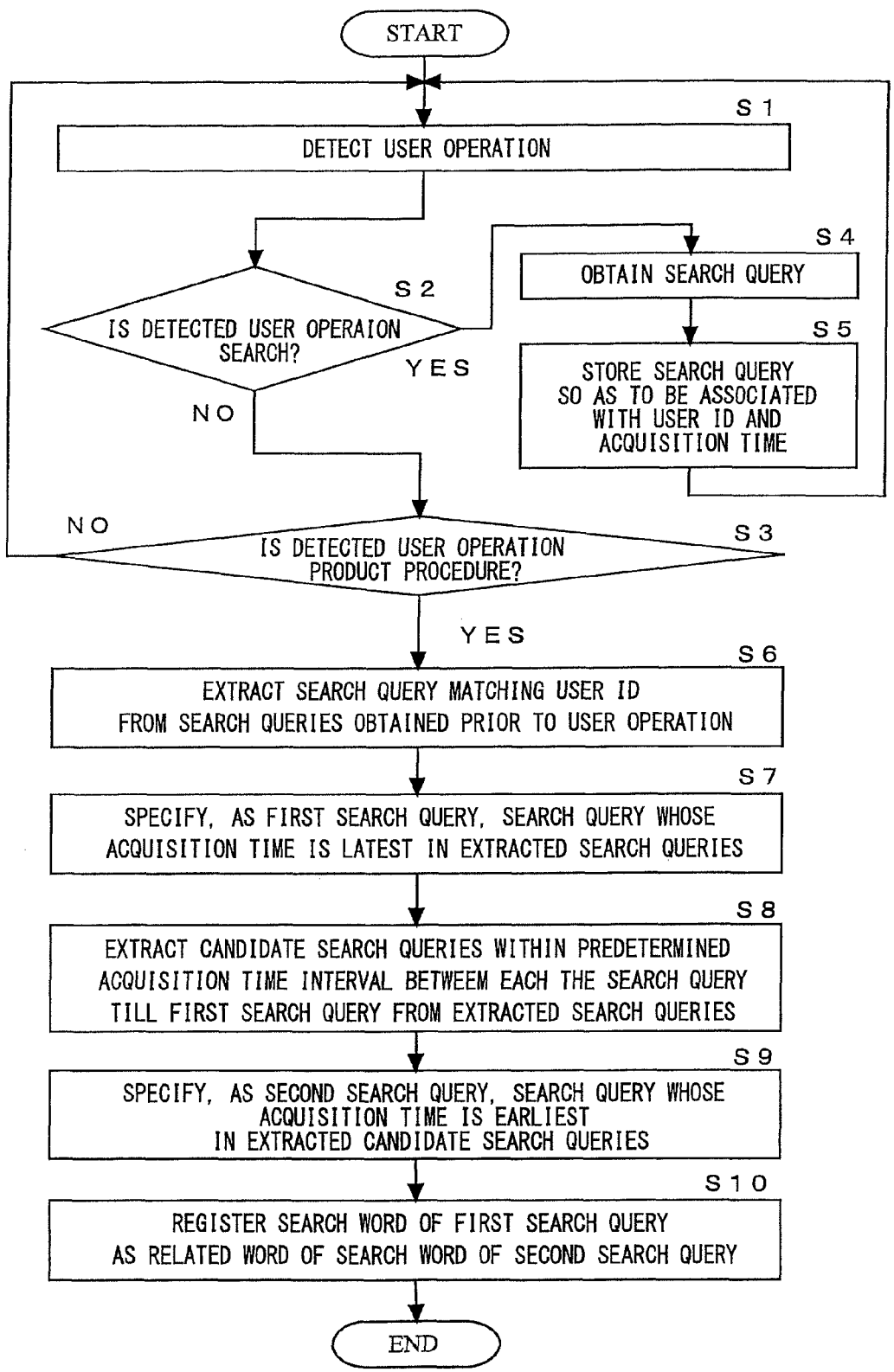
FIG. 6 is a flowchart illustrating an operation example of the related-word registration server in FIG. 1.

First, when the user (for example, user A) logs in a shopping site by the terminal 30 of the user A, as illustrated in FIG. 5, information of a web page 40 as the top page of the shopping site is transmitted from the information providing server 20 to the terminal 30. The web page 40 is displayed in the display unit 33 of the terminal 30. In the web page 40 as the top page of the shopping site, top category display 45 is displayed and linked to the categories. Further, category display 46 of products and services of related group companies of the shopping site is displayed and linked to the categories. In the web page 40, information of the user A, "Hello, A!" is displayed.

Next, when the link of the product category of "home electronics" is clicked in the web page 40 as illustrated in FIG. 5, a signal requesting display of the linked web page is transmitted from the terminal 30 to the information providing server 20. In addition, the user ID of the user A who logs in the shopping site and the category information of the product category to which the displayed web page belongs is also transmitted from the terminal 30.

As illustrated in FIG. 6, the related-word registration server 10 detects a user operation (step S1). Specifically, the system control unit 14 of the related-word registration server 10 detects a request from the terminal 30 to the information providing server 20 and other signals transmitted from the terminal 30. The kind of the request is a search query of a search word entered by the user, a request for displaying a linked web page indicative of detailed information of a product, a request to display a web page to another service, a request to display a web page of product purchase procedure, a signal of determining product purchase, or the like. The information of any of the requests is transmitted from the information providing server 20 to the related-word registration server 10. In the case of FIG. 5, the system control unit 14 of the related-word registration server 10 receives a request to display a linked web page of the product category of "home electronics" as a user operation from the information providing server 20.

Next, the related-word registration server 10 determines whether the detected user operation is a search or not (step S2). Specifically, the system control unit 14 of the related-word registration server 10 determines whether a request from the terminal 30 to the information providing server 20 includes a search query or not. In the case of FIG. 5, since the request for displaying the linked web page is not a search request (NO in step S2), the routine advances to step S3.

In the case where the detected user operation is not a search (NO in step S2), the related-word registration server 10 determines whether or not the detected user operation is a procedure on a product by the user (an example of a predetermined operation) (step S3). Specifically, the system control unit 14 of the related-word registration server 10 determines whether the detected user operation is a product purchase procedure determination (settlement) or not. In addition, the procedure on a product by the user includes not only the product purchase procedure determination (settlement) but also product reservation registration, registration to a shopping cart, bookmark to favorites, and the like. In addition, as the predetermined operation, any operation can be employed as long as achievement of the purpose of a search of the operation is known.

In the case where the user operation is not a procedure on a product by the user (NO in step S3), for example, in the case where it is a request to display a linked web page or the like, the system control unit 14 of the related-word registration server 10 returns to step S1 and waits for detection of a user operation. In the case of FIG. 5, the user operation is a request for displaying a linked web page but is not a signal of the product purchase procedure determination (settlement), the system control unit 14 returns to step S1.

Figure 7:
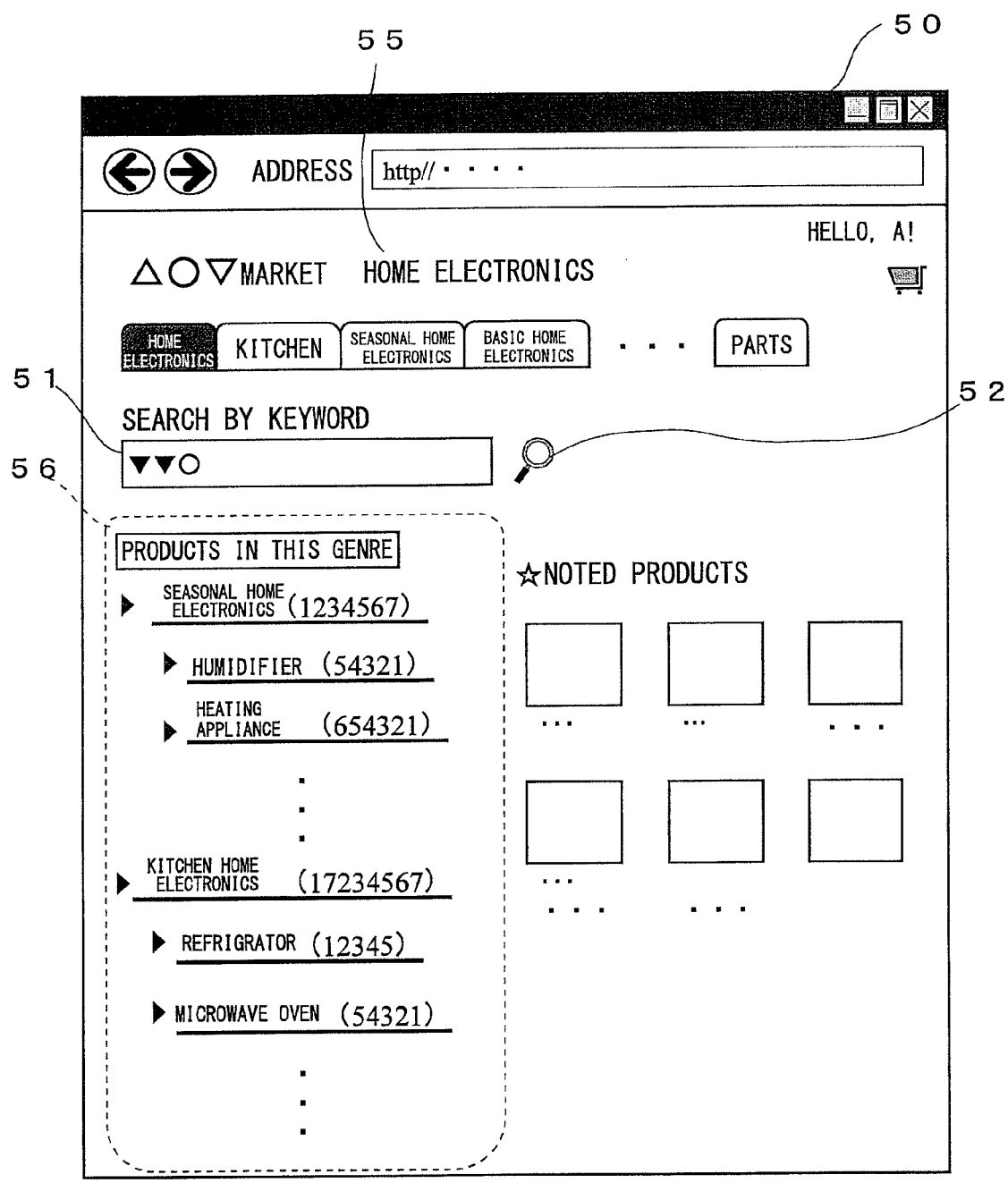
FIG. 7 is a schematic diagram illustrating an example of a web page displayed in the terminal in FIG. 1.

When the link to the product category of "home electronics" is clicked in the web page 40 as illustrated in FIG. 5, a web page 50 of "home electronics" is displayed in the display unit 33 as illustrated in FIG. 7. In the web page 50, a sub-category display 56 in a category display 55 of the top category "home electronics" is displayed.

Next, when a search word "xxx" is entered in a search word entry box 51 in the web page 50 and a search button 52 is clicked, the system control unit 36 of the terminal 30 transmits a search query to the information providing server 20 via the communication unit 31. The search query has the entered search word, the category information of the web page 50 (such as category identification number expressing the category display 65 of the top category "home electronics"), the user ID (of the user A) as an example of the user identification information, and the like.

Next, the information providing server 20 receives the search query from the terminal 30, transmits it to the related-word registration server 10, and searches the product DB 22a for a product. The IP address of a transmitter of the search query is specified and is also transmitted to the related-word registration server 10. The IP address is an example of the user identification information and, when the user does not log in, used in place of the user ID. Although the user cannot be always specified perfectly by the IP address, the user can be discriminated to some degree. The IP address is obtained from, for example, the header of a search query transmitted from the terminal 30 of the user A or the like.

Next, the related-word registration server 10 receives a search query including a search word from the information providing server 20, detects a user operation in step S1, and determines whether the detected user operation is a search or not in step S2. In the case of FIG. 7, it is a search request from the terminal 30 (YES in step S2). As illustrated in FIG. 6, the related-word registration server 10 obtains a search query including a search word (step S4). Specifically, the system control unit 14 of the related-word registration server 10 receives a search query from the information providing server 20 and stores the received search query in association with received time (an example of acquisition time) of the search query into the search query log DB 12a. Further, the system control unit 14 of the related-word registration server 10 stores the search query in association with the IP address into the search query log DB 12a. In addition, the system control unit 14 of the related-word registration server 10 may make an IP address included in a search query.

Examples of the received time include received time when the information providing server 20 receives the search query from the terminal 30 and received time when the related-word registration server 10 receives the search query from the information providing server 20. In the case of time when the information providing server 20 receives the search query from the terminal, the information providing server 20 also transmits the received time of the search query to the related-word registration server 10. The received time may be a time stamp attached when a search query is stored in the search query log DB 12a.

Next, the related-word registration server 10 stores the search query in association with the user ID and the acquisition time (step S5). Specifically, the system control unit 14 of the related-word registration server 10 stores the search query in association with the category information, the user ID (or IP address), and the received time (an example of the acquisition time) into the search query log DB 12a. In such a manner, the related-word registration server 10 functions as an example of a search query storing means that stores an obtained search query in association with user identification information and acquisition time of the search query.

Next, the related-word registration server 10 determines whether the user operation detected in step S3 is a predetermined operation or not. In the case of FIG. 7, since it is a search request from the terminal 30 (NO in step S3), the related-word registration server 10 returns to step S1 and waits for detection of a user operation.

Figure 8:
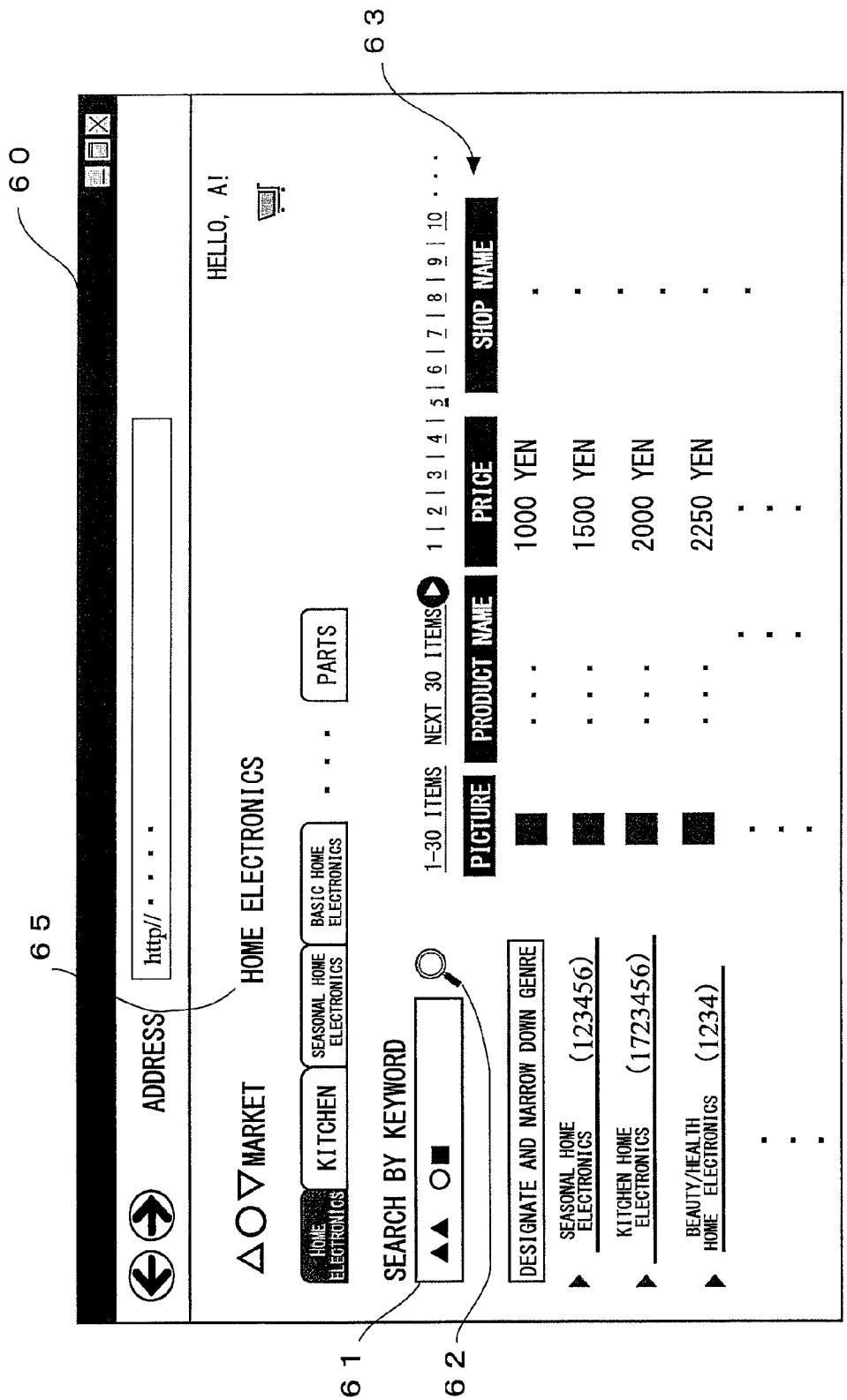
FIG. 8 is a schematic diagram illustrating an example of a web page displayed in the terminal in FIG. 1.

On the other hand, the information providing server 20 performs a product search and, after that, transmits, as a search result, the information of a web page 60 to the terminal 30 as illustrated in FIG. 8. The terminal 30 receives the information of the web page 60 from the information providing server 20 and displays it in the display unit 33.

When the user A looks at the search result of the web page 60 and finds a target product, the user A clicks the product in a product display box 63. When there is no target product, the user A enters another search word in a search word entry box 61 and clicks a search button 62. As described above, the terminal 30 transmits a search query including a search word "yyy" and category information ("home electronics") to the information providing server 20. The information providing server 20 receives the search query, and transmits it to the related-word registration server 10 to perform a search. As described above, the related-word registration server 10 receives the search query (step S4) and stores the next search query in association with category information, the user ID or the like, and the received time into the search query log DB 12a (step S5).

The user A continues the search until a target product is found and, each time, the related-word registration server 10 stores the search query into the search query log DB 12a as in steps S4 and S5.

(3.2 Registration of Related Word)

Next, registration of a related word will be described using FIG. 7 and FIGS. 9 to 11.

The user A performs a search and finds a target product and, as illustrated in FIG. 9, the detailed information on the product is displayed in a web page 70 in the display unit 33 of the terminal 30. When a button (not illustrated) to purchase procedure is clicked, the information providing server 20 starts a procedure process on the product, and transmits information of a web page 80 for confirming determination of the purchase procedure as illustrated in FIG. 10, and the web page 80 is displayed in the display unit 33 of the terminal 30.

A button 81 of determination of the purchase procedure is clicked, and a signal of product purchase determination is transmitted from the terminal 30 to the information providing server 20. The signal of product purchase determination is transmitted from the information providing server 20 to the related-word registration server 10. In addition, the user ID of the user A who logs in the shopping site and the category information of the purchased product are also transmitted from the terminal 30.

The related-word registration server 10 detects a user operation in step S1, since the user operation is a signal of product purchase determination as an example of the predetermined operation (YES in step S3), the related-word registration server 10 advances process to next step S6.

Next, as illustrated in FIG. 7, the related-word registration server 10 extracts search queries matching the user ID in the search queries obtained prior to the user operation (step S6). Specifically, the system control unit 14 of the related-word registration server 10 extracts search queries matching the user ID obtained at the time of receiving the signal of product purchase determination from the search query log DB 12a. For example, as illustrated in FIG. 11, the system control unit 14 of the related-word registration server 10 extracts a search query group 90. In FIG. 11, the search query group 90 is illustrated as search queries Qa to Qg in received time order.

In addition, when the user ID of the search query is not known in the case such that the user does not log in, the system control unit 14 of the related-word registration server 10 extracts a search query whose IP address as an example of the user identification information matches from the search query log DB 12a.

In the case where the predetermined user operation is detected, the related-word registration server 10 functions as an example of a search query extracting means that extracts a search query corresponding to user identification of the user. In the case where a settlement procedure on a product of the user is detected as a predetermined user operation, the related-word registration server 10 functions as an example of a search query extracting means that extracts a search query corresponding to user identification information.

Next, the related-word registration server 10 specifies, as a first search query, a search query whose acquisition time is latest in the extracted search queries (step S7). Specifically, as illustrated in FIG. 11, the system control unit 14 of the related-word registration server 10 specifies, as a first search query, a search query 91 whose received time as an example of acquisition time is latest from the search query group 90. In addition, the related-word registration server 10 may specify, as a first search query, a search query closest to time when the user operation is detected as illustrated in FIG. 11.

In such a manner, the related-word registration server 10 functions as an example of a first search query specifying means that specifies a first search query from extracted search queries. The related-word registration server 10 also functions as an example of a first search query specifying means that specifies, as a first search query, a search query whose acquisition time is latest in extracted search queries. The related-word registration server 10 also functions as an example of a first search query specifying means that specifies, as a first search query, a search query whose acquisition time is the closest to time when a user operation is detected.

Next, the related-word registration server 10 extracts candidate search queries whose acquisition time interval between each the search query to a first search query is within predetermined time from the extracted search queries (step S8). Specifically, as illustrated in FIG. 11, the system control unit 14 of the related-word registration server 10 extracts candidate search queries 92 (Qb, Qc) whose received time interval to an immediately preceding search query is within predetermined time T2 (an example of continuity based on acquisition time), from search queries up to the first search query 91 (Qa), as an example that received time (acquisition time) interval of search queries is within second predetermined time. This is an example of continuity based on received time (acquisition time), and the candidate search queries 92 (Qb, Qc) have continuous numbers in the order of received times of the search queries from the first search query 91 (Qa).

As described above, the related-word registration server 10 functions as an example of a second search query specifying means that specifies, as a second search query, a search query whose acquisition time is earlier than the acquisition time of the first search query and having continuity based on acquisition time in extracted search queries. The related-word registration server 10 also functions as an example of a second search query specifying means that specifies, as a second search query, a search query whose an interval of acquisition times is within second predetermined time in. In addition, the system control unit 14 of the related-word registration server 10 may extract the candidate search queries 92 (Qb, Qc, Qe, Qg) whose an interval of received times is within predetermined time T2 (an example of continuity based on acquisition time) as an example of continuity based on the received time (acquisition time).

Next, the related-word registration server 10 specifies, as a second search query, a search query whose acquisition time is earliest in the extracted candidate search queries (step S9). Specifically, as illustrated in FIG. 11, the system control unit 14 of the related-word registration server 10 specifies, as a second search query 93, a search query whose received time is earliest in the extracted candidate search queries 92. As described above, the related-word registration server 10 functions as an example of a second search query specifying means that specifies, as a second search query, a search query whose acquisition time is earlier than the acquisition time of the first search query in extracted search queries.

Next, the related-word registration server 10 registers the first search query as a related word of the second search query (step S10). Specifically, the system control unit 14 of the related-word registration server 10 registers the first search query 91 as a related word of the second search query 93 into the related-word DB 12b. In such a manner, the related-word registration server 10 functions as an example of a related-word registering means that registers, as related words, the search word in the first search query and the search word in the second search query into the related-word DB 12b.

Next, use of the constructed related-word database will be described.

At the time of performing a search on the basis of a search query received from the terminal 30 of the user, the information providing server 20 refers to the related-word DB 12*b* in the related-word registration server 10 as an example of a related-word extracting means, and extracts a related word corresponding to the search word of the search query. For example, the information providing server 20 transmits the received search query to the related-word registration server 10. The related-word registration server 10 receives the search query from the information providing server 20 and extracts a registration character string corresponding to the search word of the search query from the related-word DB 12*b*. The related-word registration server 10 as an example of a related-word outputting means transmits the extracted registration character string as a related word to the information providing server 20. The information providing server 20 transmits the received related word to the terminal 30. As illustrated in FIG. 6, the terminal 30 displays the received related word as "maybe "xxx"?" in a related-word display box 43.

In the case where the search query received from the terminal 30 is an incomplete search query (for example, "xx"), the information providing server 20 extracts a related word (for example, "xxx") corresponding to a complete search query with reference to the related-word DB 12*b* of the related-word registration server 10 and transmits it to the terminal 30. For example, in the case where another user performed searches like "xx"→"yy"→"xxx" and purchased a product related to "xxx" in the past, when the user who is making a search at present enters "xx" as a search query, the related word "yy" is presented in the web page 40 so that the user can reach a target search object quickly and the searches are converged. In addition, a plurality of related words may be displayed like "first related word" and "second related word". A related word may be displayed even in the case where the number of search results is zero or small and in the case where an incomplete search query is entered.

According to the foregoing embodiment, a search query including a search word entered by the user is received. The received search query is stored in association with user identification information such as user ID or IP address and received time of the search query into the search query log DB 12*a*. In the case where a predetermined user operation such as determination of product purchase is detected, search queries (search query group 90) corresponding to the user ID or the like of the user are extracted. From the extracted search queries, a first search query 91 is specified. From the extracted search queries, a second search query 93 (92) whose received time is earlier than received time of the first search query is specified. By registering, as related words for registration, the search word of the first search query and the search word of the second search query into the related-word database 12*b*, when a predetermined user operation is performed, search words included in search queries which varies in time in search queries whose user identification information matches are registered as related words. While maintaining relativeness of the user, the search word included in the first search query 91 which is complete and is close to the user operation time and the search word included in the second search query 93 which incomplete and is in process to a search result can be registered as high-precision related words. Here, the complete search query is a search query used when the user could reach a target search object. The incomplete search query is a search query by which the user cannot reach a target search object.

Presentation of a search word to the user on the basis of a related word helps the user to reach a target search object quickly. Since the result of trials and errors of other users to reach a search object is reflected in the related word, by presenting a path in the direction of converging searches by the related word, time and effort of a search can be saved.

In the case where the related-word registration server 10 specifies, from the extracted search queries, the second search query whose received time is earlier than that of the first search query and having continuity based on the received time, the extracted search queries can be narrowed to the second search query having continuity based on the received time. Consequently, the precision of specifying the second search query can be improved, and the precision of the related word can be improved.

In the case where the related-word registration server 10 specifies the search queries 92 whose an interval of received times is within the second predetermined time T2 as second search queries having continuity based on received time, the extracted search queries whose an interval of received times is within the second predetermined time T2 as continuity based on received time can be easily extracted, and search queries can be narrowed down to the second search queries having continuity based on received time. Therefore, the precision of related words can be improved.

In the case where a settlement procedure on a product of the user is detected as a predetermined user operation, the related-word registration server 10 extracts search queries corresponding to the user identification information such as the user ID or IP address, specifies a first search query and a second query from the extracted search queries, and registers them as related words. In such a manner, as compared with the case of using, as a trigger to the search query extracting process, shopping-cart registration, bookmark registration, or the like, search queries corresponding to the result of search which is led to the settlement are complete queries having higher precision, and a search query extracting process start condition can be properly set. Therefore, the precision of related words to be registered as a final result can be improved.

In the case where the related-word registration server 10 specifies, as a first search query, a search query whose received time is closest to the time when the user operation is detected or specifies, as a first search query, a search query whose received time is latest in extracted search queries, the relativeness between the first search query and the user operation is high. Therefore, the precision of related words can be improved.

In the case where the information providing server 20 extracts a related word corresponding to a search word of a received search query with reference to a related-word database and outputs it, the related word having high precision by which the user can reach a search object quickly can be presented to the user.

(3.3 Modification of Operation of Related-Word Registration System 1)

Figure 12:
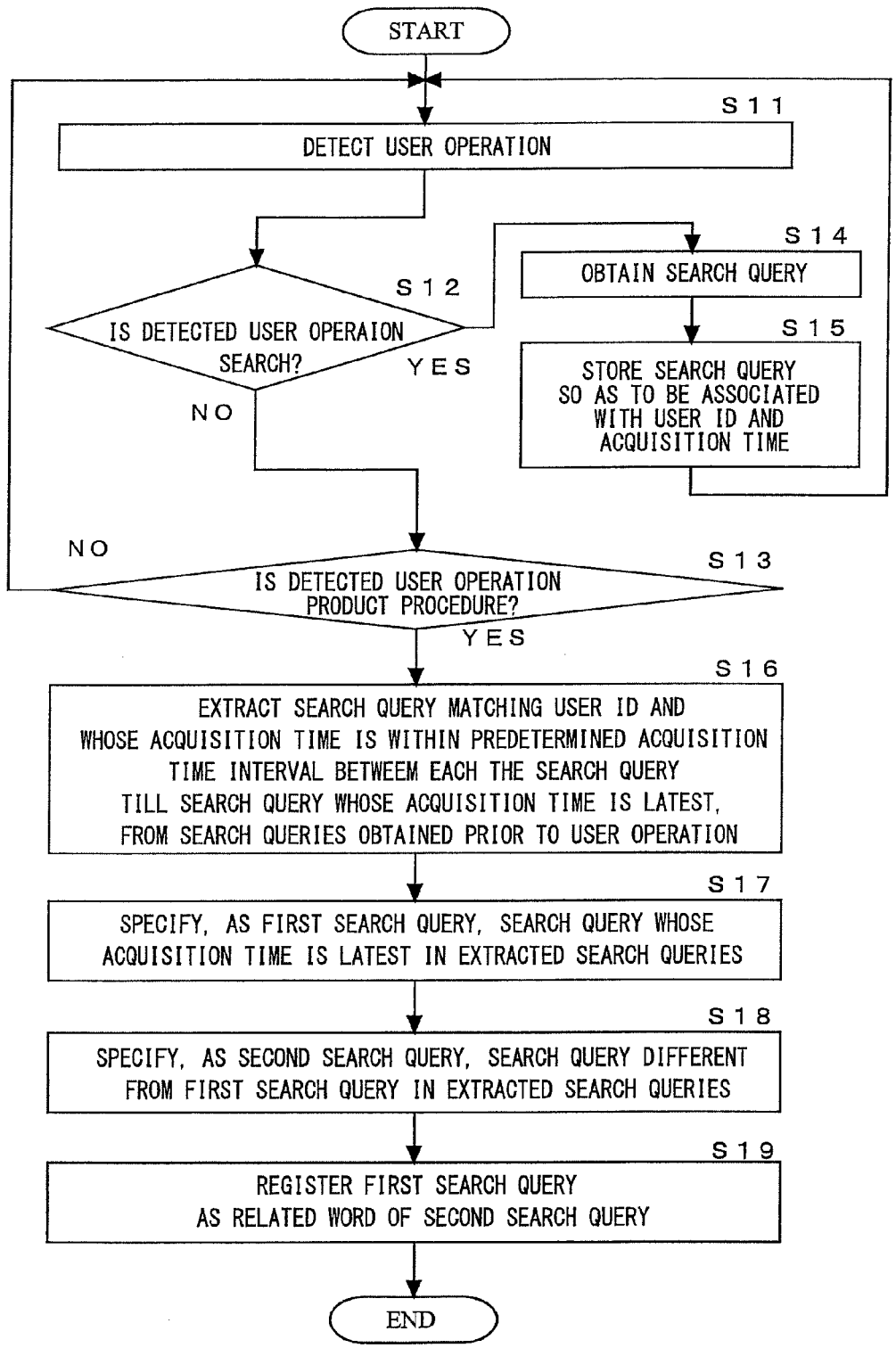
FIG. 12 is a flowchart illustrating a modification of the operation of the related-word registration server in FIG. 1.
Figure 13:
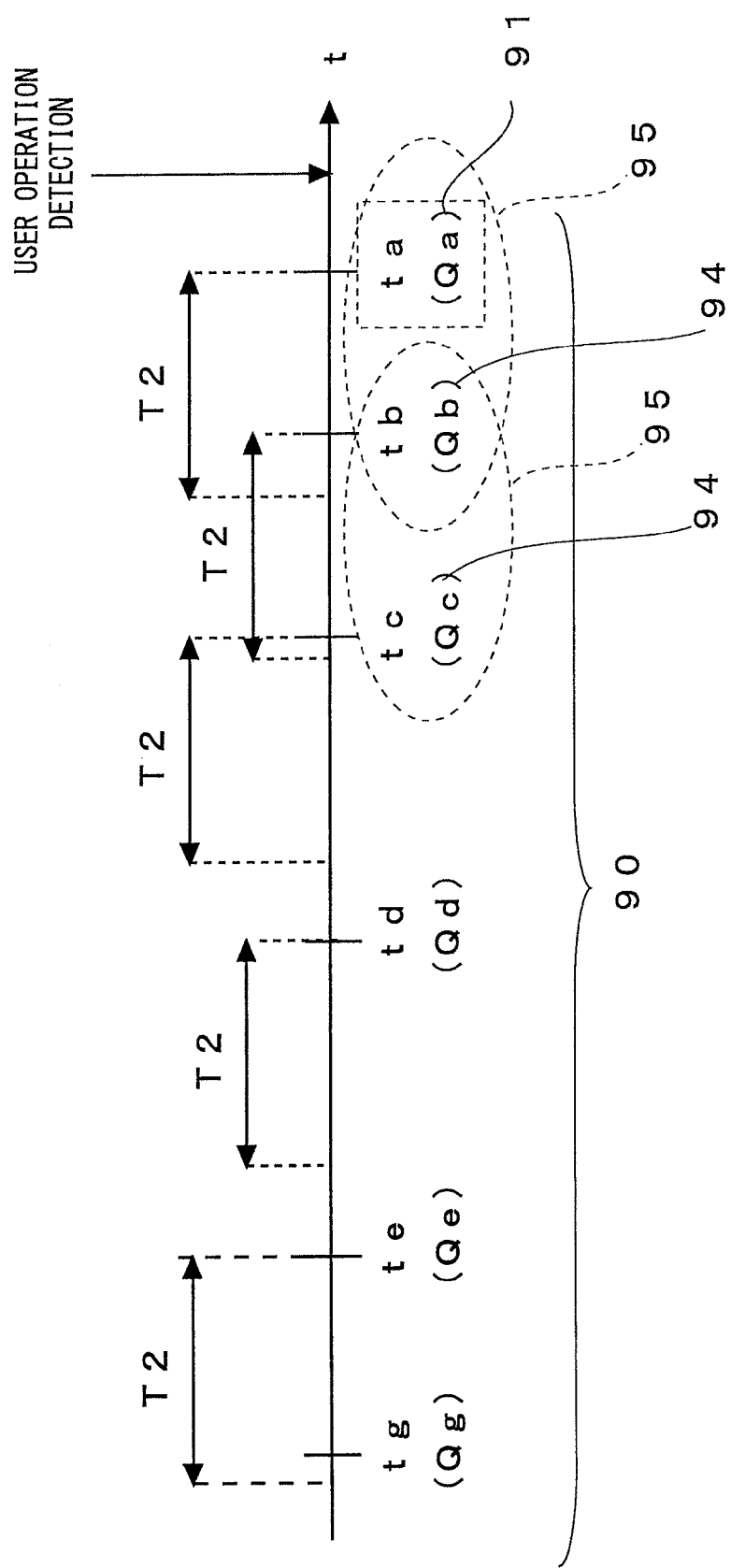
FIG. 13 is a schematic diagram illustrating an example of the relation between time when a user operation is detected and search query acquisition time.

A modification of the operation of the related-word registration system 1 will be described using FIGS. 12 and 13. In addition, since steps S11 to S15 correspond to steps S1 to S5, respectively, their description will not be repeated. The same reference numerals are designated to parts which are the same as or correspond to those in the foregoing embodiments, and only different configuration and operation will be described. The other modifications will be similarly described.

As illustrated in FIG. 10, the purchase procedure determination button 81 is clicked in the web page 80, and a signal of product purchase determination is transmitted from the terminal 30 to the information providing server 20. After the signal of product purchase determination is transmitted from the information providing server 20 to the related-word registration server 10, the processes in steps S11 to S13 are performed in the related-word registration server 10.

Next, the related-word registration server 10 extracts search queries corresponding to user ID and whose an interval of acquisition times is within predetermined time up to a search query whose acquisition time is the latest from search queries obtained prior to user operation (step S16). Specifically, the system control unit 14 of the related-word registration server 10 extracts, from the search query log DB 12*a*, the search queries 92 corresponding to the user ID obtained at the time of reception of the signal of product purchase determination, and the search queries 92, as illustrated in FIG. 13, whose an acquisition time interval between each the search query is within predetermined time T2 up to the search query 91 whose acquisition time is latest. For example, as illustrated in FIG. 13, the system control unit 14 of the related-word registration server 10 extracts search query groups 95.

As described above, the related-word registration server 10 functions as an example of a search query extracting means, when a predetermined user operation is detected, that extracts search queries corresponding to user identification information of the user and having continuity based on the acquisition time. The related-word registration server 10 also functions as an example of a search query extracting means that extracts search queries whose an interval of acquisition times is within the second predetermined time T2 as search queries having continuity based on acquisition time.

Next, the related-word registration server 10 specifies, as a first search query, a search query whose acquisition time is latest in the extracted search queries (step S17). Specifically, as illustrated in FIG. 13, the system control unit 14 of the related-word registration server 10 specifies, as a first search query, the search query 91 whose received time as an example of acquisition time is latest in the search query group 95.

Next, the related-word registration server 10 specifies, as a second search query, a search query which is different from the first search query in the extracted search queries (step S18). Specifically, as illustrated in FIG. 13, the system control unit 14 of the related-word registration server 10 specifies, as a second search query, the search query 94 different from the first search query 91. In such a manner, the related-word registration server 10 functions as an example of a second search query specifying means that specifies, as a second search query, a search query different from the first search query from extracted search queries.

Next, the related-word registration server 10 registers the first search query as a related word of the second search query (step S19). Specifically, the system control unit 14 of the related-word registration server 10 registers the first search query 91 as a related word of each of the second search queries 93 and 94 into the related-word DB 12*b*. The system control unit 14 of the related-word registration server 10 may specify, as the second search query 93, a search query whose received time is earliest in the search queries 93 and 94 and register the first search query 91 as a related word of the second search query 93 into the related-word DB 12*b*.

In the foregoing modification of the embodiment, a search query including a search word entered by the user is received, and the received search query is stored in association with user identification information and received time of the search query. In the case where a predetermined user operation is detected, search queries corresponding to the user identification information of the user are extracted. A first search query is specified from the extracted search queries, and a search query different from the first search query is specified as a second search query. A search word included in the first search query and a search word included in the second search query are registered as related words into the related-word DB 12*b*. In such a manner, using a predetermined user operation as a trigger, search words included in search queries different from each other are registered as related words from search queries having the same user identification information. Consequently, while maintaining relativeness of the user, a search word included in the first search query 91 which is close to the user operation time and is complete and a search word included in the second search query 93 which is incomplete and is in process to a search result can be registered as related words having high precision.

Figure 14:
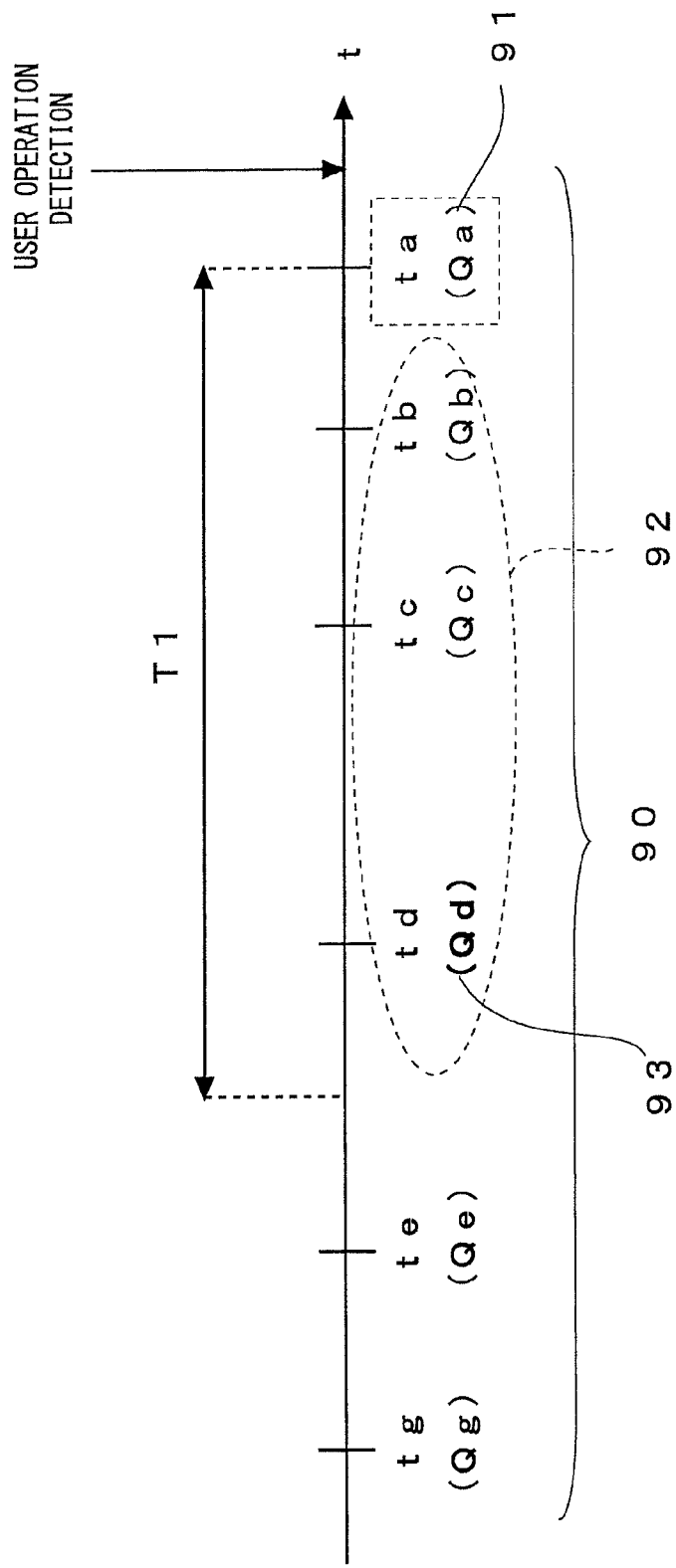
FIG. 14 is a schematic diagram illustrating an example of the relation between time when a user operation is detected and search query acquisition time.

In addition, as illustrated in FIG. 14, the related-word registration server 10 may specify, as second search queries having continuity based on acquisition time, candidate search queries 92 whose acquisition times are within first predetermined time T1 (an example of continuity based on acquisition time). The related-word registration server 10 may extract, as search queries having continuity based on acquisition time, the search queries 91 and 92 obtained within the first predetermined time T1 since the acquisition time of the search query 91 whose acquisition time is latest.

In those cases, the extracted search queries existing within predetermined time since the acquisition time of the first search query closest to the detection time of the predetermined user operation are specified as the second search queries. Consequently, the relativeness to the predetermined user operation is high, the precision of specifying the second search query is improved, and the precision of related words can be improved.

Figure 15:
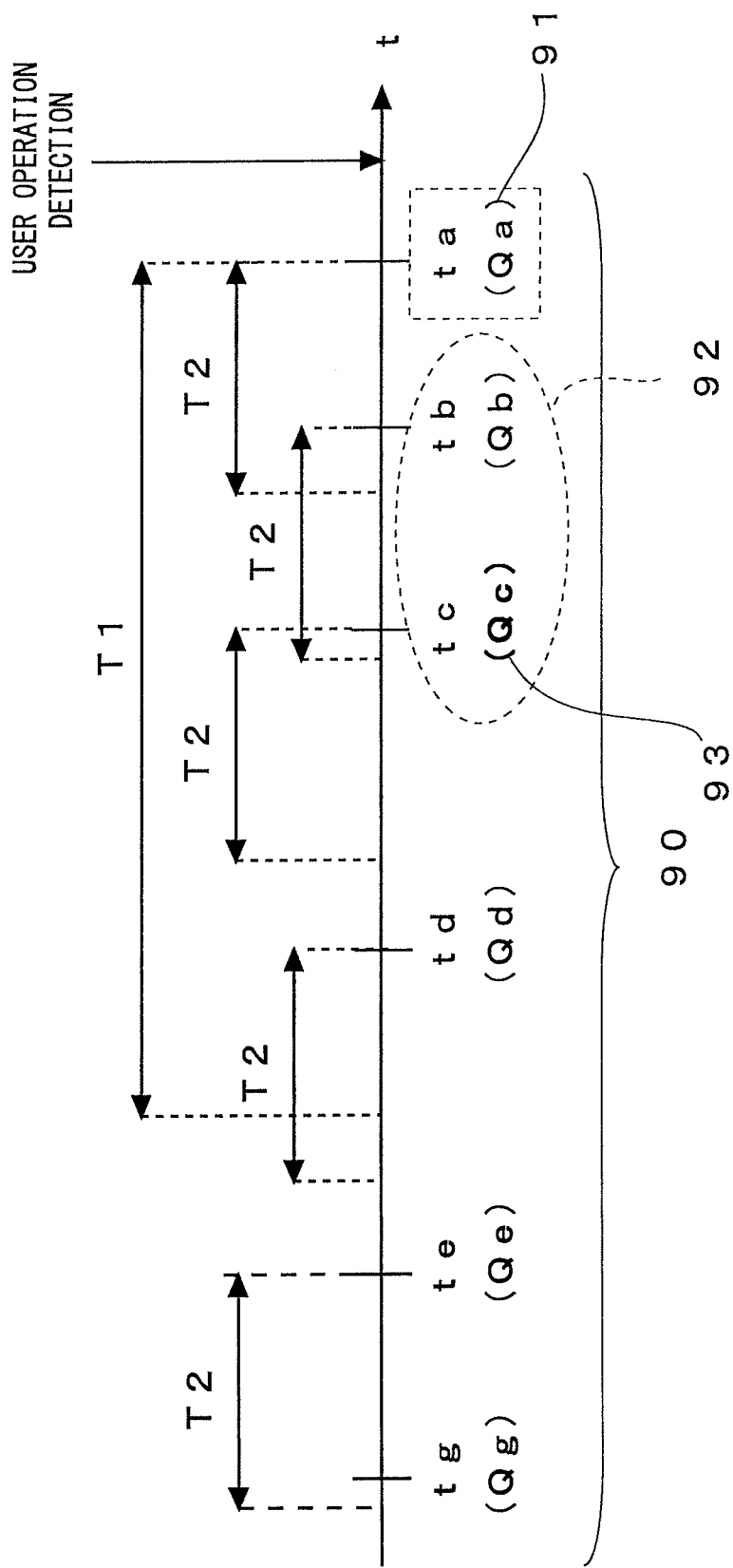
FIG. 15 is a schematic diagram illustrating an example of the relation between time when a user operation is detected and search query acquisition time.

In the case where the related-word registration server 10 sets the first predetermined time T1 or the second predetermined time T2, for example, the first predetermined time T1 or the second predetermined time T2 can be made fluctuate in accordance with the kind of a predetermined user operation. Therefore, a related word can be extracted according to the kind of the predetermined user operation, and the precision of the related word can be improved. Further, as illustrated in FIG. 15, in the case of setting the first predetermined time T1 and the second predetermined time T2, the candidate search queries 92 can be extracted in accordance with the setting of the first predetermined time T1 and the second predetermined time T2. The precision of specifying the second search query is improved, and the precision of a related word can be improved.

The related-word registration server 10 may set the first predetermined time T1 or the second predetermined time T2 on the basis of the number of related words registered by the related-word registering means. For example, in the case where the number of related words registered in the related-word DB 12*b* increases and it is unnecessary to increase related words, by shortening the predetermined times T1 and T2, the number of candidate search queries 92 whose acquisition time is close to the first search query decreases, so that the number of related words newly registered can be decreased. Further, since the acquisition time is close, relativeness in terms of time increases, and the precision of related words can be also improved. In the initial state of the related-word DB 12*b* or in the case where the number of relative words registered is small, by increasing the predetermined times T1 and T2, the number of registered related words is increased, and the related-word DB 12b can be enriched.

Figure 16:
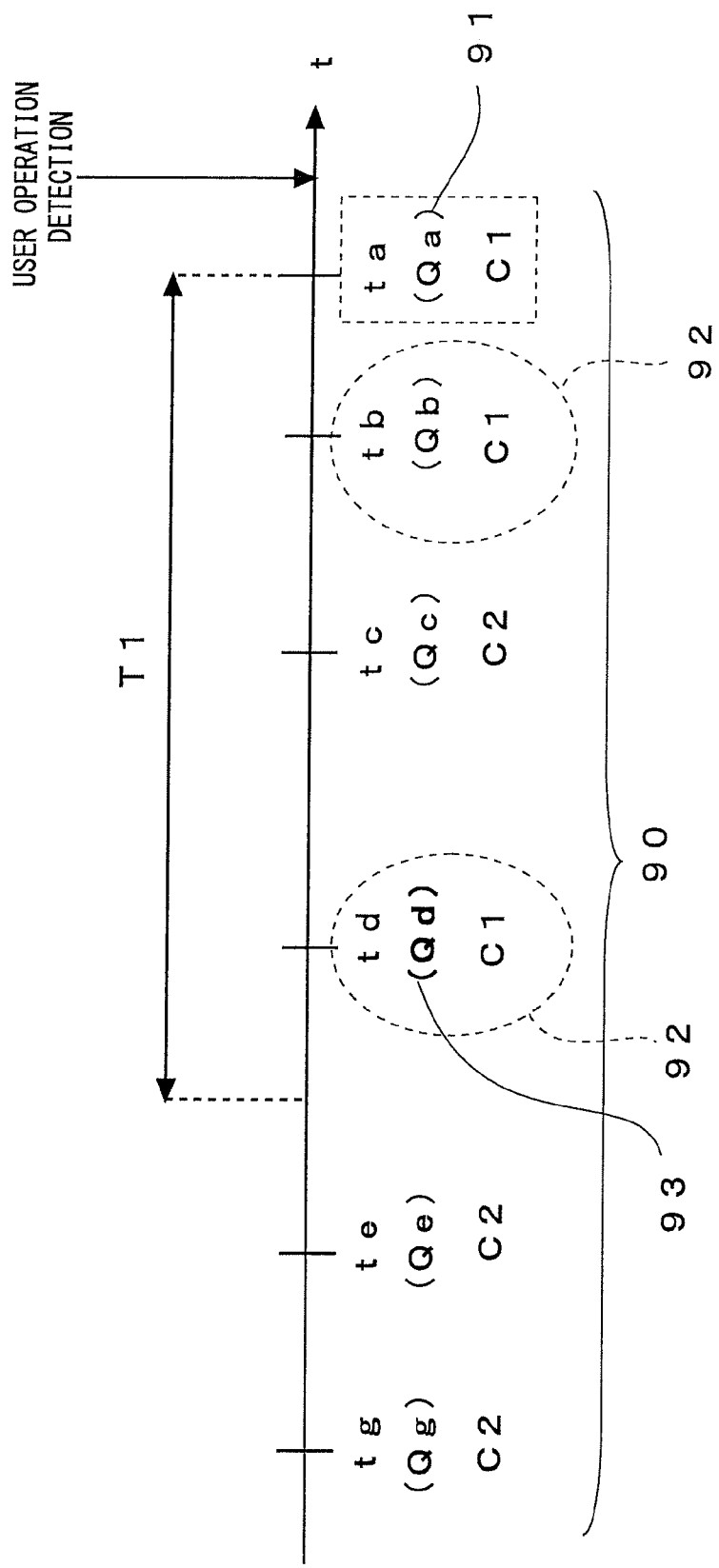
FIG. 16 is a schematic diagram illustrating an example of the relation between time when a user operation is detected and search query acquisition time.

The related-word registration server 10 may obtain category information together with the search query in searching the product DB 22a or the like, and specify a second search query having matched category information, whose acquisition time is earlier than the first search query, and having continuity based on the acquisition time. For example, as illustrated in FIG. 16, at the time of storing a search query into the search query log DB 12a, the related-word registration server 10 stores the search query together with category information (categories C1 and C2). The related-word registration server 10 specifies the candidate search queries 92 whose category matches the category C1 of the first search query 91, whose acquisition time is earlier than acquisition time of the first search query 91 and having continuity based on the acquisition time.

Since the second search query is specified on the basis of search queries whose category information matches, the precision of related words can be improved. In addition, the related-word registration server 10 may extract, as an example of the search query extracting means of the modification, search queries whose category information matches, corresponding to identification information of the user, and having continuity based on acquisition time.

Figure 17:
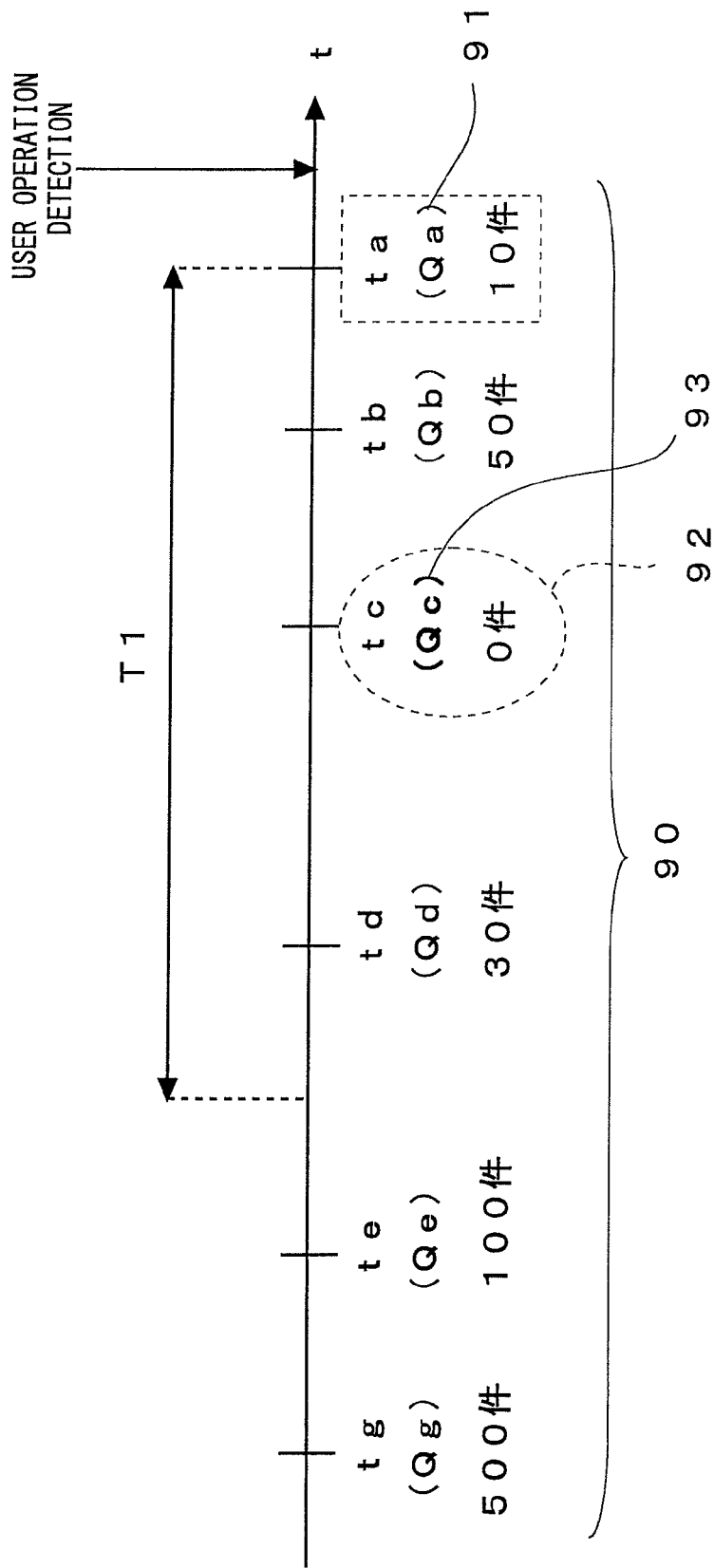
FIG. 17 is a schematic diagram illustrating an example of the relation between time when a user operation is detected and search query acquisition time.

The related-word registration server 10 may specify, as second search queries, search queries whose acquisition time is earlier than that of the first search query, having continuation based on acquisition time, and whose number of search results is equal to or less than a predetermined value. For example, as illustrated in FIG. 17, the candidate search query 92 whose number of search times is zero is specified. In addition, in the case where the number of search times is zero, the reason may be a typing mistake, entry of a wrong search word, a search query including a plurality of search words with "AND" condition, or the like. The search query can be regarded as an incomplete search query. This incomplete search query and the search word of the first search query which is complete can be registered as related words, so that the precision of related words by which the user can reach the target search object quickly can be improved.

In addition, in this case, the related-word registration server 10 obtains the number of search results when the information providing server 20 performs a search on the basis of a search query from the information providing server 20 and stores it together with the search query in the search query log DB 12a. Further, the related-word registration server 10 as an example of a search query extracting means of the modification may extract a search query corresponding to identification information of the user, having continuity based on acquisition time, and whose number of search results is equal to or less than a predetermined value.

The related-word registration server 10 may calculate operation time from a predetermined user operation and set the first predetermined time T1 or the second predetermined time T2 on the basis of the operation time. According to a user operation pattern such as reproduction time of a moving picture, searching performed by temporarily stopping a moving picture, viewing time of a web page, or search time, the predetermined time T1 or the second predetermined time T2 can be set, and a search query can be specified according to the set predetermined time T1 or the second predetermined time T2. Consequently, the precision of related words can be improved.

The related-word registration server 10 may detect reproduction information of a moving picture as a predetermined user operation, calculate a moving picture reproduction characteristic value such as reproduction time of a moving picture, the number of reproduction times, or lapse time since moving picture reproduction time until start of operation on the basis of the reproduction information and, in the case where the moving picture reproduction characteristic value is equal to or larger than a threshold, extract a search query corresponding to user identification information. For example, a moving picture of long reproduction time or a moving picture which is reproduced many times is often a moving picture demanded by the user or a moving picture the user is not tired of, and it can be said the user could reach a search object close to the target of the user. Therefore, the first search query becomes a high-precision more-complete search query, and the precision of related words can be improved.

The related-word registration server 10 may extract a search query corresponding to user identification information in the case where the number of pieces of link information clicked by the predetermined user operation in link information included in search results based on the search query is equal to or larger than a predetermined number. For example, in the case where the number of links clicked in link information included in a web page as a search result is equal to or larger than a predetermined number, the search result includes much of information the user is interested in. Consequently, a search query corresponding to the search result is a search query adapted to the intention of the user (correct search query) (for a search query corresponding to a search result in which the number of pieces of link information clicked is less than the predetermined number). Therefore, the precision of the first search query is further improved, and the precision of a related word can be improved. In addition, the related-word registration server 10 counts the number of pieces of clicked link information by user IDs or by domains each corresponding to an IP address.

Other than the link information of each record displayed in a search result, the link information clicked by a predetermined user operation may be, for example, information of so-called "next-page button" which is a button for displaying a search result next to a search result being displayed. The state where "next page button" in a plurality of web pages is clicked, that is, a plurality of links of "next page button" is clicked one by one (a plurality of pieces of link information is clicked) can be said a state where the user deeply checks search results based on the search query and is interested in the search results based on the search query. Therefore, the search query is a correct search query, and the precision of a first search query further improves, and the related-word registration server 10 can improve the precision of a related word.

In addition, the above-described process in the embodiment may be performed by the terminal 30. In the terminal 30, related words are generated. When a predetermined number of related words are stored in the terminal, the related words are transmitted to the related-word registration server 10. In addition, a search query log and a related-word database are constructed in the storage unit 32. A program for registering related words may be assembled in a plug-in (such as a tool bar) of a web browser provided from the information providing server 20 or the like. Since processes are performed by the terminal 30 of the user, collation of the user ID is unnecessary in extraction of a search query or the like.

Specifically, the system control unit 36 of the terminal 30 detects an operation of the user from the operation unit 34 in step S1 and determines whether the detected user operation is a search or not. For example, in FIG. 7, in the case where the search button 52 in the web page 50 is clicked, the system control unit 36 of the terminal 30 obtains a search word entered in the search word entry box 51 in order to construct a search query log in step S4.

Next, the system control unit 36 of the terminal 30 stores the search query in association with acquisition time into the storage unit 12 in step S5.

When the system control unit 36 of the terminal 30 detects a predetermined user operation from the operation unit 34 in step S3, the system control unit 36 of the terminal 30 extracts a search query obtained before the user operation in step S6.

Next, the system control unit 36 of the terminal 30 specifies, as a first search query, a search query whose acquisition time is latest in the extracted search queries in step S7.

Next, in step S8, the system control unit 36 of the terminal 30 extracts candidate search queries whose acquisition time intervals between each the search query until the first search query are within predetermined time from the extracted search queries.

Next, in step S9, the system control unit 36 of the terminal 30 specifies, as a second search query, a search query whose acquisition time is earliest in the extracted candidate search queries.

Next, in step S10, the system control unit 36 of the terminal 30 stores the first search query as a related word of the second search query into the storage unit 32 or the RAM 36*c*.

Next, in the case where the number of related words registered exceeds a predetermined threshold, at predetermined time, when predetermined time has lapsed since a related word is transmitted to the related-word registration server 10, or the like, the system control unit 36 of the terminal 30 transmits the related word to the related-word registration server 10. The system control unit 36 of the terminal 30 may transmit the related word to the related-word registration server 10 each time a related word is generated. As described above, the terminal 30 functions as an example of a related-word transmitting means that transmits a search word in a first search query and a search word in a second search query as related words for registration to the related-word registration device.

In addition, the shopping site may be an external EC site connected to the network 3, and the information providing server 20 is not limited to product search but may be a general search server.

(3.4 Another Modification of Operation of Related-Word Registration System 1)

Another modification of the operation of the related-word registration system 1 will be described using FIGS. 10, 11, and 18.

Figure 18:
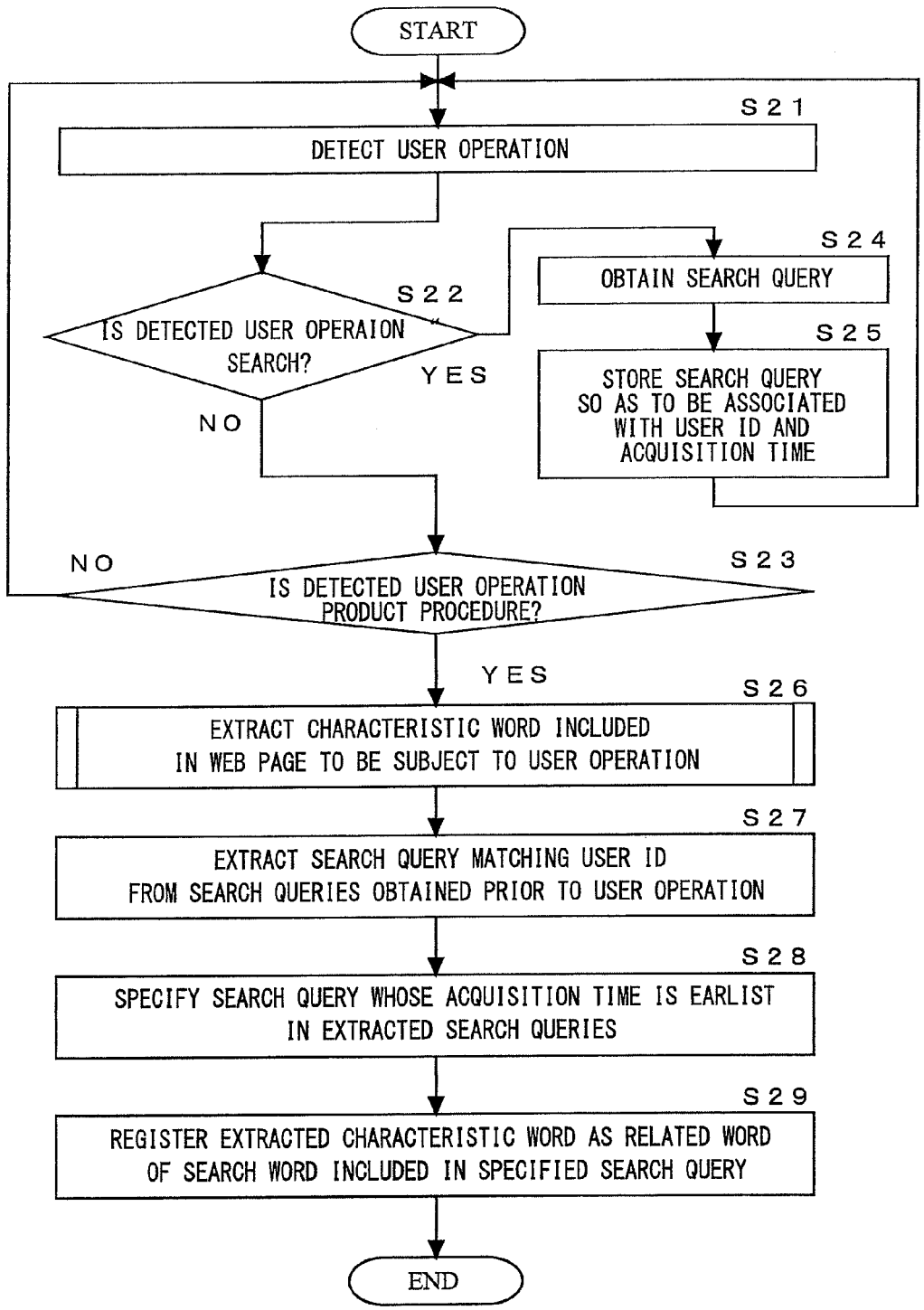
FIG. 18 is a flowchart illustrating another modification of the operation of the related-word registration server in FIG. 1.

In addition, in the flowchart of FIG. 18, steps S21 to S25 correspond to steps S1 to S5, respectively, so that description on steps S21 to S° will not be given.

As illustrated in FIG. 18, in step S23, when the user operation is product procedure, the related-word registration server 10 extracts a characteristic word included in a web page to be subjected to a user operation (step S26). Specifically, as illustrated in FIG. 10, the system control unit 14 of the related-word registration server 10 extracts a characteristic word from the web page 70 to be subject to a user operation such as a click on the button 81 of purchase procedure determination in the web page 80 and obtains it.

In addition, the details of the characteristic word extraction will be described later in a subroutine of a characteristic word. As described above, the related-word registration server 10 functions as an example of a characteristic word obtaining means that obtains a characteristic word included in a web page to be subjected to a user operation in the case where a predetermined user operation is detected.

Next, the related-word registration server 10 extracts a search query matching the user ID from search queries obtained before a user operation (step S27). Specifically, the system control unit 14 of the related-word registration server 10 extracts a search query matching the user ID obtained on reception of a signal of product purchase determination from the search query log DB 12*a*. For example, as illustrated in FIG. 11, the system control unit 14 of the related-word registration server 10 extracts the search query group 90. In FIG. 11, the search query group 90 is illustrated from a search query Qa to a search query Qg in the order of received time. The search query 91 is a search query which hits a target search object.

Next, the related-word registration server 10 specifies, as a search query, a search query whose acquisition time is earliest in the extracted search queries (step S28). Specifically, as illustrated in FIG. 11, the system control unit 14 of the related-word registration server 10 specifies the search query 93 (candidate search query) whose received time as an example of acquisition time is earliest from the search query group 90.

Next, the related-word registration server 10 registers the extracted search word as a related word of a search word included in the specified search query (step S29). Specifically, the system control unit 14 of the related-word registration server 10 registers the extracted characteristic word and the search word included in the search query 93 as related words into the related-word DB 12*b*. The related-word registration server 10 functions as an example of a related-word registration means that registers, as related words, the obtained characteristic word and the search word in the specified search query into the related-word DB 12*b*.

(3.5 Extraction of Characteristic Word)

A subroutine of a characteristic word will be described using FIG. 9 and FIGS. 18 to 21.

In the subroutine modification, the related-word registration server 10 obtains an HTML file from the web page 70 or the like, analyzes it, extracts content as a web material (text data, image data, and the like) on a content block unit, calculates the appearance frequency of each of content blocks constructing a plurality of web pages, specifies content having the lowest appearance frequency or whose appearance frequency is equal to or less than a predetermined value (for example, five times) as a content block unique to the web page, conducts morphological analysis on the specified content, and extracts a characteristic word. In addition, the related-word registration server 10 may determine the predetermined value of appearance frequency on the basis of the number of content blocks to be subjected to appearance frequency calculation.

Specifically, an HTML document which is stored in the product DB 22*a* is preliminarily obtained from the information providing server 20 and analyzed, and content as a web material is extracted on the content block unit basis. As an extraction result, content block corresponding information (an example of content information) is stored on the extracted content block unit basis into the characteristic-word DB 12*c*. Basically, content blocks of all of HTML documents on products registered in the storage of the product DB 22a, that is, all of product description pages constructing the shopping site are extracted in advance.

With reference to the content block correspondence information, the appearance frequency of content blocks of a target web page is calculated, and a peculiar content block is specified.

Here, the content blocks and the content block correspondence information will be described using FIGS. 9, 19, and 20.

As illustrated in FIG. 9, for example, in the web page 70 such as a product description page or a blog page, pieces of content as web materials are displayed in groups (blocks). Each block corresponds to a content block. The content pieces are divided into content blocks by a DIV tag and a TABLE tag (examples of predetermined tags) described in an HTML file. That is, the content pieces are divided (grouped) into blocks by the DIV tag and the TABLE tag (hereinbelow, called block-forming tags).

FIG. 9 illustrates content blocks 71 to 76. The content block 71 is, for example, a content block of a header part of the page and is constructed by a text A and an image "a".

The content block 72 is, for example, a content block of a navigation part to move to a web page on products of any of various categories and is constructed by, for example, text B, text C, and text D indicting links to other web pages.

The content block 73 is, for example, a content block corresponding to a display region of product description and includes text E showing the title and the content blocks 74 and 75. In this way, there is a case that the content blocks are nested, that is, in a hierarchical structure. In this case, the content included in the content block 73 is only the text E. The content blocks 74 and 75 are independent of the content block 73. Each of the content blocks 74 and 75 is description of one product. The content block 74 is constructed by the texts F and G indicating the title and main body of the description of the product. The content block 75 is constructed by the texts H, I, and J indicating the title and the main body of description of a product and product images "b" and "c". The content block 76 is, for example, a content block showing copyright indication and is constructed by the text I.

The content blocks 71, 72, 73, and 76 in those content blocks appear relatively frequently on web pages other than the web page 70 illustrated in FIG. 9. On the other hand, the content blocks 74 and 75 are basically used only for the web page 70. Therefore, it is determined that the content block 74 or 75 is a content block peculiar to the web page 70.

Figure 19:
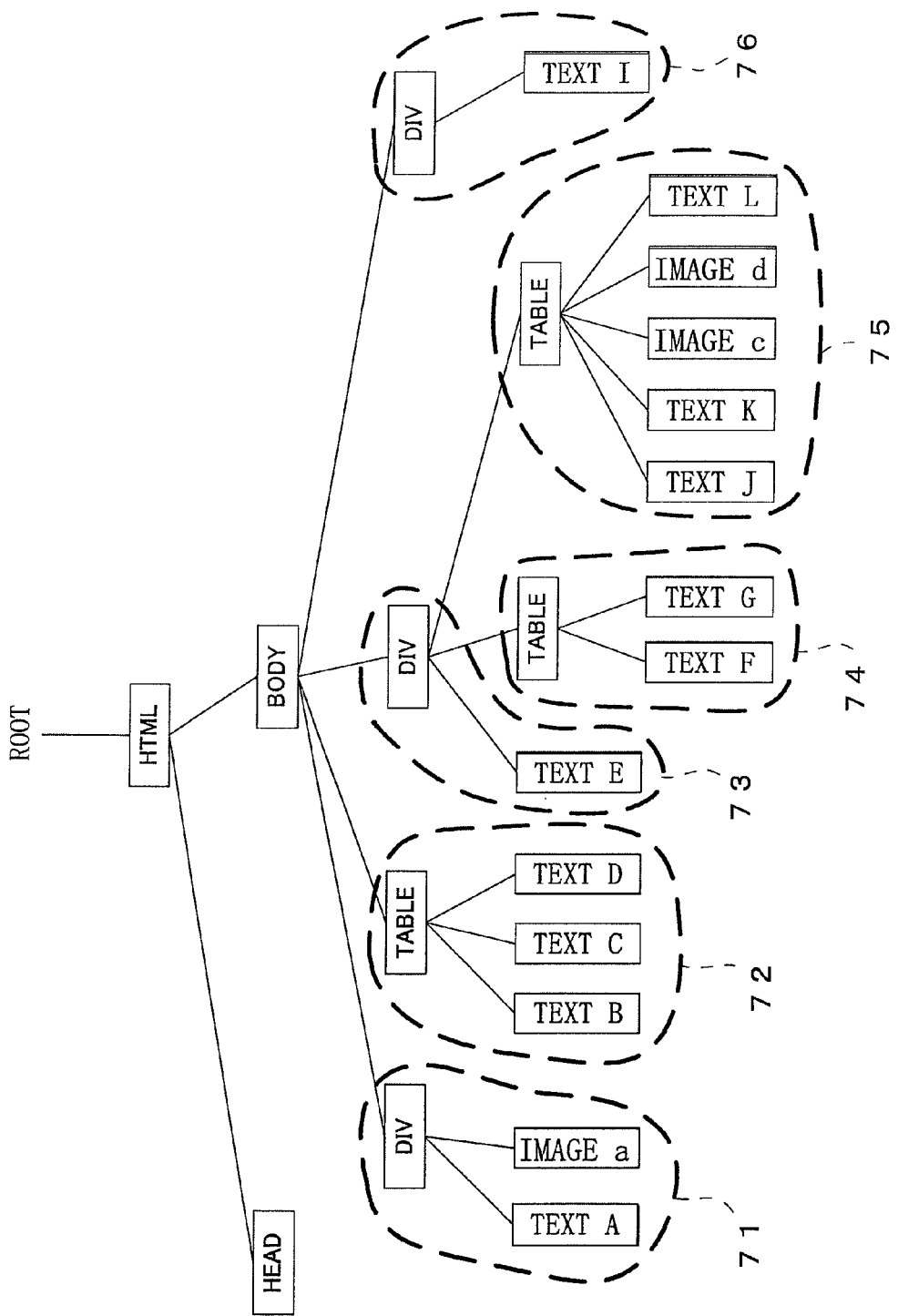
FIG. 19 is a schematic diagram illustrating an example of a DOM tree generated from an HTML document.
Figure 20:
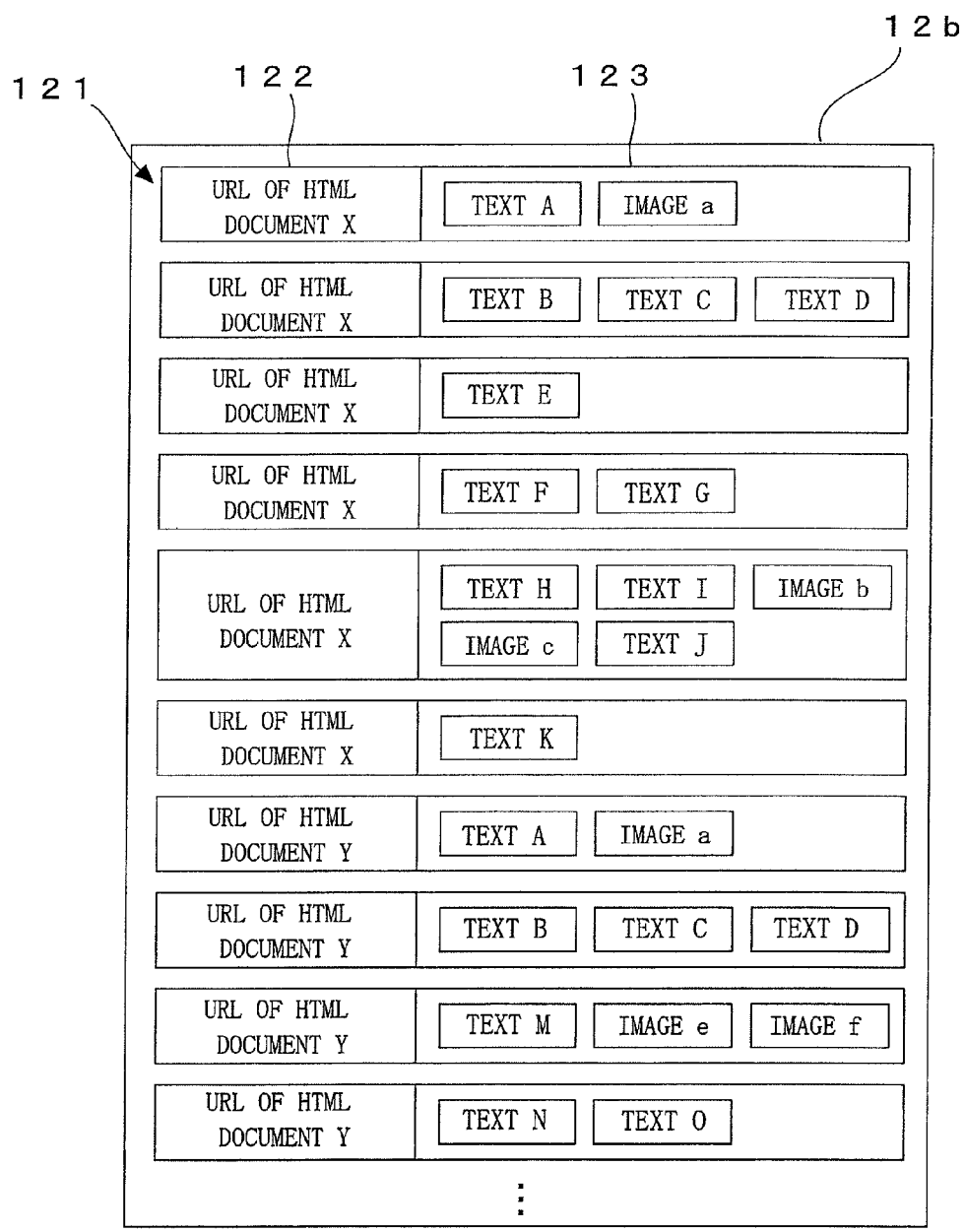
FIG. 20 is a schematic diagram illustrating an example of the details of content information recorded in a database for a characteristic word.

FIG. 19 expresses the HTML document of the web page 70 in FIG. 9 in the form of a DOM (Document Object Model) tree, that is, a tree structure.

In the DOM tree, DIV nodes indicating DIV tags and TABLE nodes indicating TABLE tags are nodes for forming the content into the content blocks (hereinbelow, called block forming nodes").

The system control unit 14, for example, searches the DOM tree by depth-first search and determines the content blocks. Specifically, when a block forming node is found, the system control unit 14 collects content pieces specified in respective nodes of subtrees using the node as the apex into a content block.

As a result of hierarchically specifying the content blocks, after a block forming node (hereinbelow, called a "high-order block forming node") is found, when a block forming node (hereinbelow, called a "low-order block forming node") is found from nodes as descendent nodes of the block forming node, the content block is divided. For example, when it is assumed that the closer a node to the root node is, the higher in hierarchy the node is, a content block corresponding to a subtree using the high-order block forming node as an apex (hereinbelow, called "high-order subtree") is divided into a content block corresponding to a subtree using the low-order block forming node as an apex (hereinbelow, called "low-order subtree") and a content block corresponding to the part except for the low-order subtree in the high-order subtree (for example, the content blocks 74 and 73). In this case, it is assumed that the former content block is lower than the latter content block in the hierarchy. For example, the level in the hierarchy of the content blocks 71, 72, 73, and 76 is 1, and the level in the hierarchy of the content blocks 74 and 75 is 2. That is, the smaller the value of the hierarchy is, the higher the level in the hierarchy is.

When a content block is extracted, the related-word registration server 10 stores the content block correspondence information indicative of the extraction result into the characteristic-word DB 12c. As illustrated in FIG. 20, content block correspondence information 121 is registered by content blocks. The content block correspondence information is constructed by an URL setting part 122 of an HTML document as an extraction source and block configuration information 123. In the block configuration information, extracted content pieces are set. Here, as text data, the data in a text node in the DOM tree is set. On the other hand, as image data, the URL of image data as src attribute of an IMG node indicative of an IMG tag in the DOM tree is set in place of the image data itself.

The operation of the subroutine of a characteristic word will be described using FIG. 21.

Figure 21:
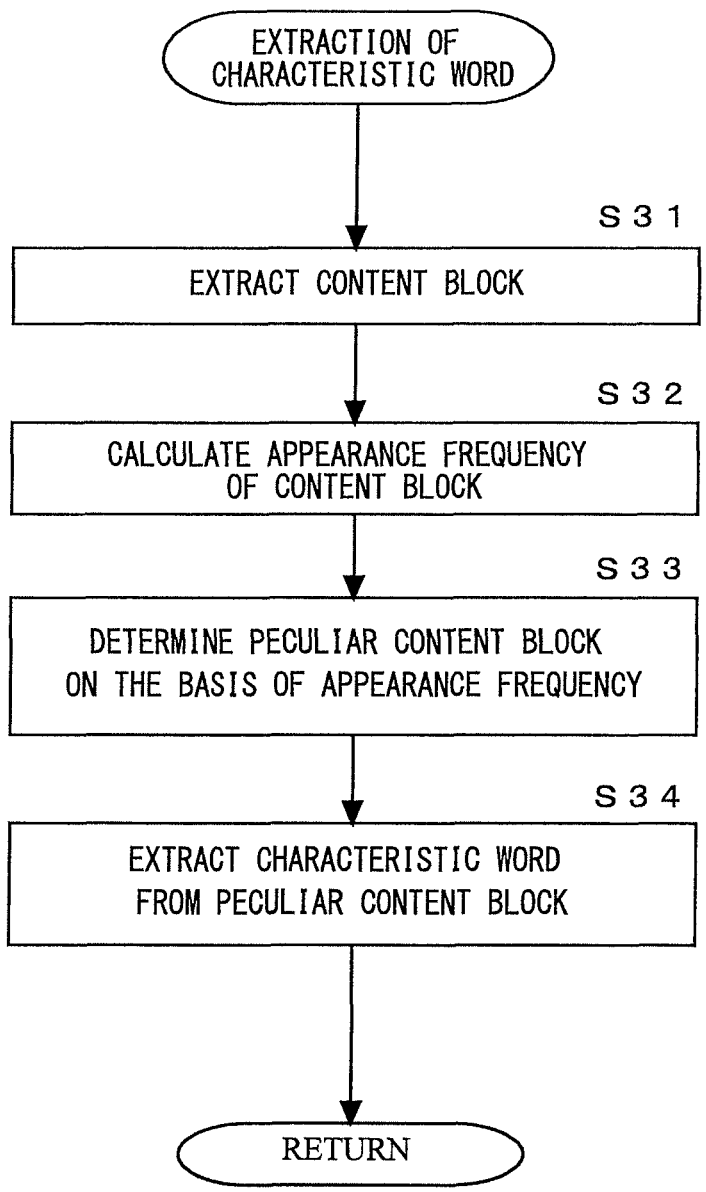
FIG. 21 is a flowchart illustrating a subroutine of extraction of a characteristic word.

As illustrated in FIG. 21, when the subroutine of the characteristic word is called, for example, the related-word registration server 10 obtains an HTML file of the web page 70 and extracts a content block (step S31). Specifically, as illustrated in FIG. 19, the system control unit 14 of the related-word registration server 10 generates a DOM tree of the HTML file (HTML document) of the web page 70. The system control unit 14 of the related-word registration server 10 searches the DOM tree (three searching process) and extracts a content block on the basis of the kind of a block forming node and the level in the tree structure.

Next, with reference to the characteristic-word DB 12c, the related-word registration server 10 calculates the appearance frequency in all of product detailed pages of extracted content blocks (step S32). Specifically, the system control unit 14 of the related-word registration server 10 compares the block configuration information of the content block generated by the tree searching process with block configuration information 123 of each of the content block correspondence information 121 stored in the characteristic-word DB 12c.

When the details of the block configuration information match, the system control unit 14 increments the number of appearance times by one. In addition, the system control unit 14 may ignore the specification order of content in the block configuration information.

In the case where text data specified in the block configuration information is compared with each other, the system control unit 14 may determine whether there is a match or not insubstantial things expressed by sentences or the like made by the text data, not in the sentences themselves indicated by the text data. For example, the system control unit 14 may perform the morphological analysis or the like on the text data, thereby extracting words from the text data, and compare the extracted words. When all of the words match, the system control unit 14 may determine that the text data matches. In the case where the words match at predetermined ratio or higher, it may be determined that the text data matches.

The system control unit 14 calculates the appearance frequency by comparing the block configuration information of the content blocks and block configuration information of all of content block correspondence information stored in the characteristic-word DB 12c. In addition, the appearance frequency calculated may be the number of appearance times (frequency) or the ratio of the number of appearance times (the relative frequency) to all of content blocks in all product detailed pages.

Next, the related-word registration server 10 determines a peculiar content block on the basis of the appearance frequency (step S33). Specifically, the system control unit 14 of the related-word registration server 10 determines the content block having the lowest appearance frequency as the peculiar content block.

Next, the system control unit 14 of the related-word registration server 10 extracts a characteristic word from the peculiar content block (step S34). Specifically, the system control unit 14 of the related-word registration server 10 performs the morphological analysis and extracts words having high appearance frequency as characteristic word.

As described above, the related-word registration server 10 functions as an example of a characteristic word obtaining means that obtains a characteristic word by performing the morphological analysis on a web page. The related-word registration server 10 also functions as a characteristic word obtaining means that obtains a characteristic word by calculating the appearance frequency of each of content pieces constructing a web page, specifying content on the basis of the appearance frequency, and performing morphological analysis.

As described above, in the modification, a search query including a search word entered by the user is received, and the obtained search query is stored in association with user identification information and received time of the search query. In the case where a predetermined user operation is detected, a characteristic word included in the web page as an object of the user operation is obtained, and search queries (search query group 90) corresponding to the user identification information of the user who performed the user operation are extracted. The search query 93 is specified on the basis of acquisition time from the extracted search queries. The extracted characteristic word and a search word in the specified search query are registered as related words into the related-word DB 12b. In such a manner, using a predetermined user operation as a trigger, the characteristic word having deep relation with the user operation and the search word in the search query corresponding to the user identification information in relation to the user operation in time are registered as related words. Consequently, while maintaining relativeness of the user, a search word corresponding to the user operation when the user reached the target search object (the characteristic word obtained from the result of the complete search query) and the search word included in a search query which is incomplete and is in process to a search result can be registered as related words having high precision.

In addition, the characteristic word and the search word of the complete search query 91 have deep relativeness. Here, the complete search query is a search query used when the user could reach a target search object. In the search query group 90, the search queries are incomplete search queries except for the search query 91 which is completed. By the incomplete search queries, the user cannot reach a target search object.

In the case of performing the morphological analysis on a web page to obtain a characteristic word, the peculiar characteristic word related to the web page can be extracted with high precision. Therefore, the high-precision characteristic word and the search word can be registered as high-precision related words.

In the case where content constructing a designated web page is extracted, the appearance frequency of each of content constructing the designated web page 70 is calculated, and it is determined that content having the lowest appearance frequency or whose appearance frequency is equal to or less than a predetermined value (for example, five times) in the content constructing the designated web page is content unique to the web page 70, and in the case where a predetermined value of appearance frequency is determined on the basis of the number of content blocks whose appearance frequency is to be calculated and peculiar content is determined, the lower the appearance frequency is, the less the content appears except for the designated web page 70. Consequently, by determining content having the lowest appearance frequency or having appearance frequency which is equal to or less than the predetermined value, the content peculiar to the designated web page 70 is specified with high precision. Therefore, content peculiar to the web page 70 can be easily extracted.

Also in the case of performing the morphological analysis on the peculiar content to obtain a characteristic word, a peculiar characteristic word related to the web page can be extracted with high precision. Therefore, the high-precision characteristic word and the search word can be registered as high-precision related words.

Further, the present invention is not limited to the foregoing embodiments. The embodiments are illustrative, and any component which has a substantially same configuration as the technical idea described in the scope of claims for patent in the present invention and produces similar effects is included in the technical range of the present invention.

EXPLANATION OF REFERENCE NUMERALS

1: related-word registration system
10: related-word registration server (related-word registration device)
12a: search query log DB
12b: related-word DB
20: information providing server (information processing device)
22a: product DB
30: terminal (related-word registration device)
32: storage device (search query log DB, related-word DB)

What is claimed is:

1. A related-word registration device comprising:
at least one memory operable to store computer program code;
at least one processor operable to access said at least one memory and operate as instructed by said program code:
search query obtaining code that causes at least one of said at least one processor to obtain a search query including a search word entered by a user;
search query extracting code, in the case where a predetermined user operation different from a search is detected, that causes at least one of said at least one processor to extract search queries corresponding to the user identification information of the user from a search query storage that stores the obtained search query in association with the user identification information;

first search query specifying code that causes at least one of said at least one processor to specify a first search query from the extracted search queries;

second search query specifying code that causes at least one of said at least one processor to specify, as a second search query, a search query different from the first search query from the extracted search queries;

related-word registering code that causes at least one of said at least one processor to register, as related words, a search word in the first search query and a search word in the second search query into a related-word database; and moving picture reproduction characteristic value calculating code that causes at least one of said at least one processor to detect moving picture reproduction information as the predetermined user operation and calculate a moving picture reproduction characteristic value on the basis of the reproduction information.

2. The related-word registration device according to claim 1, further configured to execute: product procedure code that causes at least one of said at least one processor to perform procedure process on a product, wherein in the case where the payment procedure on a product of the user is detected, the search query extracting code causes at least one of said at least one processor to extract the search query.

3. The related-word registration device according to claim 1, wherein in the case where the moving picture reproduction characteristic value is equal to or larger than a threshold, the search query extracting code causes at least one of said at least one processor to extract the search query.

4. The related-word registration device according to claim 1, wherein in the case where a number of pieces of link information clicked by the predetermined user operation in link information included in search results based on the search query is equal to or larger than a predetermined number, the search query extracting code causes at least one of said at least one processor to extract the search query.

5. The related-word registration device according to claim 1, wherein the obtained search query in the search query obtaining code is stored in the search query storage in association with user identification information and acquisition time of the search query, the second search query specifying code causes at least one of said at least one processor to specify a second search query whose acquisition time is earlier than acquisition time of the first search query, from the extracted search queries, wherein the second search query specifying code causes at least one of said at least one processor to specify, as a second search query, a search query whose acquisition time is earlier than acquisition time of the first search query and having continuity based on the acquisition time in the extracted search queries, wherein the second search query specifying code causes at least one of said at least one processor to specify, as a second search query, search queries whose interval of acquisition times is within second predetermined time in the extracted search queries.

6. The related-word registration device according to claim 5, further comprising predetermined time setting code that causes at least one of said at least one processor to set the second predetermined time on the basis of the number of related words registered by the related-word registering code.

7. The related-word registration device according to claim 6, wherein the search query obtaining code causes at least one of said at least one processor to obtain category information together with the search query in searching, and the second search query specifying code causes at least one of said at least one processor to specify, as a second search query, a search query matched with the category information, whose acquisition time is earlier than the first search query, and having continuity based on the acquisition time.

8. The related-word registration device according to claim 6, wherein the first search query specifying code causes at least one of said at least one processor to specify, as a first search query, a search query whose acquisition time is closest to a time at which the user operation is detected.

9. The related-word registration device according to claim 6, wherein the first search query specifying code causes at least one of said at least one processor to specify, as a first search query, a search query whose acquisition time is latest among search queries extracted.

10. The related-word registration device according to claim 5, further comprising predetermined time setting code that causes at least one of said at least one processor to calculate operation time from the predetermined user operation and, on the basis of the operation time, set the second predetermined time.

11. The related-word registration device according to claim 10, wherein the search query obtaining code causes at least one of said at least one processor to obtain category information together with the search query in searching, and the second search query specifying code causes at least one of said at least one processor to specify, as a second search query, a search query matched with the category information, whose acquisition time is earlier than the first search query, and having continuity based on the acquisition time.

12. The related-word registration device according to claim 10, wherein the first search query specifying code causes at least one of said at least one processor to specify, as a first search query, a search query whose acquisition time is closest to a time at which the user operation is detected.

13. The related-word registration device according to claim 10, wherein the first search query specifying code causes at least one of said at least one processor to specify, as a first search query, a search query whose acquisition time is latest among search queries extracted.

14. The related-word registration device according to claim 1, wherein the obtained search query in the search query obtaining code is stored in the search query storage in association with user identification information and acquisition time of the search query, the second search query specifying code causes at least one of said at least one processor to specify a second search query whose acquisition time is earlier than acquisition time of the first search query, from the extracted search queries, wherein the second search query specifying code causes at least one of said at least one processor to specify, as a second search query, a search query whose acquisition time is earlier than acquisition time of the first search query and having continuity based on the acquisition time in the extracted search queries.

15. The related-word registration device according to claim 14, wherein the second search query specifying code causes at least one of said at least one processor to specify, as a second search query, a search query whose acquisition time is earlier than that of the first search query, having continuity based on the acquisition time, and whose number of search results is equal to or less than a predetermined value.

16. The related-word registration device according to claim 15, wherein the first search query specifying code causes at least one of said at least one processor to specify, as a first search query, a search query whose acquisition time is closest to a time at which the user operation is detected.

17. The related-word registration device according to claim 15, wherein the first search query specifying code causes at least one of said at least one processor to specify, as a first search query, a search query whose acquisition time is latest among search queries extracted.

18. A related-word registration method of a related-word registration device for registering related words, executed by at least one computer process and comprising:
   obtaining a search query including a search word entered by a user;
   in the case where a predetermined user operation different from a search is detected, extracting search queries corresponding to the user identification information of the user from a search query storage that stores the obtained search query in association with the user identification information;
   specifying a first search query from the extracted search queries;
   specifying, as a second search query, a search query different from the first search query from the extracted search queries; and
   registering, as related words, a search word in the first search query and a search word in the second search query into a related-word database; and
   detecting moving picture reproduction information as the predetermined user operation and calculating a moving picture reproduction characteristic value on the basis of the reproduction information.

19. A related-word registration system having a terminal, a related-word registration device which is connected to the terminal via a network, and receives a related word from the terminal, and a related-word database which registers the related word, wherein the terminal comprises:
   at least one memory operable to store program code;
   at least one processor operable to access said memory, read said program code, and operate as instructed by said program code, said program code including:
   search query obtaining code that causes at least one of said at least one processor to obtain a search query including a search word entered by a user;
   search query extracting code, in the case where a predetermined user operation different from a search is detected, that causes at least one of said at least one processor to extract search queries corresponding to the user identification information of the user from a search query storage that stores the obtained search query in association with the user identification information;
   first search query specifying code that causes at least one of said at least one processor to specify a first search query from the extracted search queries;
   second search query specifying code that causes at least one of said at least one processor to specify, as a second search query, a search query different from the first search query from the extracted search queries;
   related-word transmitting code that causes at least one of said at least one processor to transmit, as related words for registration, a search word in the first search query and a search word in the second search query to the related-word registration device,
   related-word registering code that causes at least one of said at least one processor to register, as related words, the search word in the first search query and the search word in the second search query received into the related-word database; and
   moving picture reproduction characteristic value calculating code that causes at least one of said at least one processor to detect moving picture reproduction information as the predetermined user operation and calculate a moving picture reproduction characteristic value on the basis of the reproduction information.

* * * * *